United States Patent
Ly et al.

(10) Patent No.: US 11,102,820 B2
(45) Date of Patent: *Aug. 24, 2021

(54) RANDOM ACCESS PROCEDURE TIMING DESIGNS

(71) Applicant: QUALCOMM Incorporated, San Diego, CA (US)

(72) Inventors: Hung Ly, San Diego, CA (US); Hao Xu, Beijing (CN); Wanshi Chen, San Diego, CA (US); Tingfang Ji, San Diego, CA (US); Renqiu Wang, San Diego, CA (US); Peter Gaal, San Diego, CA (US); Amir Aminzadeh Gohari, Sunnyvale, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,429

(22) Filed: Jun. 17, 2019

(65) Prior Publication Data

US 2019/0306893 A1 Oct. 3, 2019

Related U.S. Application Data

(63) Continuation of application No. 15/648,313, filed on Jul. 12, 2017, now Pat. No. 10,327,265.

(Continued)

(51) Int. Cl.
*H04L 1/18* (2006.01)
*H04L 5/00* (2006.01)
(Continued)

(52) U.S. Cl.
CPC ........... *H04W 74/0833* (2013.01); *H04L 1/18* (2013.01); *H04L 5/001* (2013.01); *H04L 5/0044* (2013.01);
(Continued)

(58) Field of Classification Search
CPC ............ H04B 17/364–382; H04L 1/18; H04L 1/1822; H04L 1/1825; H04L 1/1829;
(Continued)

(56) References Cited

U.S. PATENT DOCUMENTS 10,327,265 B2 * 6/2019 Ly ..................... H04W 74/0833
2008/0233941 A1 9/2008 Jen et al.
(Continued)

FOREIGN PATENT DOCUMENTS

| CN | 102771174 A | 11/2012 | |
| WO | 2016048044 A1 | 3/2016 | |
| WO | WO-2016048044 A1 * | 3/2016 | ........ H04W 74/0833 |

OTHER PUBLICATIONS

International Search Report and Written Opinion—PCT/US2017/055638—ISA/EPO—dated Jan. 17, 2018.

*Primary Examiner* — Timothy J Weidner
(74) *Attorney, Agent, or Firm* — Arent Fox, LLP

(57) ABSTRACT

A configurable new radio (NR) RACH procedure that may be executed by a UE and a base station is disclosed. A first message can be transmitted, in an inactive or idle state, a on a physical random access channel, where the first message includes a random access preamble. A second message can be received on a downlink channel in response to the first message, where the second message includes a temporary cell radio network temporary identifier and an uplink grant for the user equipment. A request can be transmitted on an uplink channel based on the uplink grant. A common search space of a downlink control channel can be monitored, such as for an acknowledgement message or a negative acknowledgement message corresponding to the request and identifiable based on the temporary cell radio network temporary identifier.

20 Claims, 13 Drawing Sheets

Related U.S. Application Data

(60) Provisional application No. 62/417,883, filed on Nov. 4, 2016.

(51) Int. Cl.

| | | |
|---|---|---|
| *H04L 27/00* | (2006.01) | |
| *H04W 8/24* | (2009.01) | |
| *H04W 24/02* | (2009.01) | |
| *H04W 28/02* | (2009.01) | |
| *H04W 36/00* | (2009.01) | |
| *H04W 48/12* | (2009.01) | |
| *H04W 72/14* | (2009.01) | |
| *H04W 74/00* | (2009.01) | |
| *H04W 74/08* | (2009.01) | |
| *H04W 88/02* | (2009.01) | |
| *H04W 88/08* | (2009.01) | |
| *H04W 92/10* | (2009.01) | |

(52) U.S. Cl.
CPC .......... *H04L 5/0055* (2013.01); *H04L 5/0091* (2013.01); *H04W 8/245* (2013.01); *H04W 24/02* (2013.01); *H04W 28/0215* (2013.01); *H04W 36/0077* (2013.01); *H04W 48/12* (2013.01); *H04W 72/14* (2013.01); *H04W 74/008* (2013.01); *H04W 74/085* (2013.01); *H04L 27/0006* (2013.01); *H04W 88/02* (2013.01); *H04W 88/08* (2013.01); *H04W 92/10* (2013.01)

(58) Field of Classification Search
CPC ... H04L 1/1861; H04L 1/1864; H04L 1/1867; H04L 1/1893; H04L 1/1896; H04L 5/003; H04L 5/0053; H04L 5/0055; H04L 5/0058; H04L 5/0064; H04L 5/0076–0098; H04L 5/14; H04L 5/1438–1453; H04W 8/18–245; H04W 24/02; H04W 24/04; H04W 28/02–0215; H04W 28/16–26; H04W 36/0005–385; H04W 48/02–20; H04W 72/005–14; H04W 74/002–0891; H04W 80/02; H04W 84/02; H04W 84/04–045; H04W 88/02; H04W 88/08; H04W 92/04; H04W 92/10

See application file for complete search history.

(56) References Cited

U.S. PATENT DOCUMENTS

| | | |
|---|---|---|
| 2010/0260140 A1 | 10/2010 | Zhu |
| 2012/0039295 A1 | 2/2012 | Quan et al. |
| 2014/0204843 A1* | 7/2014 | Larsson ............ H04W 74/0833 |
| 2016/0309518 A1 | 10/2016 | Patel et al. |

* cited by examiner

1000

1002 determining, by a user equipment, one of a plurality of random access procedure timelines based on a use case or a deployment case

| inactive state in a connected mode | handover | frequency band of base station that UE is attempting to access | cell size of base station that UE is attempting to access |

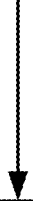

1004 performing, by the user equipment, a configurable random access procedure according to the one of the plurality of random access procedure timelines based on the use case or the deployment case

| current numerology associated with base station with which the user equipment is connected | target numerology associated with the target base station | numerology associated with the base station | numerology associated with the base station and the cell size |

FIG. 10

RANDOM ACCESS PROCEDURE TIMING DESIGNS

CLAIM OF PRIORITY UNDER 35 U.S.C. § 119

This application is a continuation of U.S. patent application Ser. No. 15/648,313, entitled "RANDOM ACCESS PROCEDURE TIMING DESIGNS," filed on Jul. 12, 2017, which claims priority to U.S. Provisional Application No. 62/417,883, entitled "NEW RADIO (NR) RANDOM ACCESS PROCEDURE (RACH) TIMING DESIGNS" filed Nov. 4, 2016, which are assigned to the assignee hereof and hereby expressly incorporated by reference herein for all purposes.

BACKGROUND

Aspects of the present disclosure relate generally to wireless communication networks, and more particularly, to random access channel procedures in a wireless communication network.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current random access channel procedures may not provide a desired level of speed or customization for efficient operation. Thus, improvements in wireless communication network operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method of wireless communications including receiving, by a user equipment, a configuration indicating one or more parameters related to determining a random access procedure timeline, and transmitting, by the user equipment in an inactive or idle state, a first message on a physical random access channel, wherein the first message includes a random access preamble. The method also includes receiving, by the user equipment, a second message on a downlink channel in response to the first message, wherein the second message includes a temporary cell radio network temporary identifier and an uplink grant for the user equipment. Further, the method includes transmitting, by the user equipment and based on the random access procedure timeline, a request on an uplink channel based on the uplink grant. Additionally, the method includes monitoring, by the user equipment, a common search space of a downlink control channel for an acknowledgement message or a negative acknowledgement message corresponding to the request and identifiable based on the temporary cell radio network temporary identifier.

In another aspect, the present disclosure includes a method of wireless communications that includes transmitting, by a user equipment in an inactive or idle state, a first message on a physical random access channel, wherein the first message includes a random access preamble. Also, the method includes receiving, by the user equipment, a second message on a downlink channel in response to the first message, wherein the second message includes a temporary cell radio network temporary identifier and an uplink grant for the user equipment. Further, the method includes transmitting a request on an uplink channel based on the uplink grant, and monitoring, by the user equipment, a common search space of a downlink control channel for a downlink grant for receiving a contention resolution message in response to the request.

In a further aspect, the present disclosure includes a method of wireless communications that includes performing, by a user equipment, a first portion of a configurable random access procedure with a base station using a fixed numerology and/or a fixed reference timing. Also, the method includes receiving, by the user equipment, base station capability information, and transmitting, by the user equipment, user equipment capability information. Additionally, the method includes performing, by the user equipment, a second portion of the configurable random access procedure with the base station using a different numerology and/or a different reference timing based on one or both of the base station capability information and the user equipment capability information.

In another aspect, the present disclosure includes a method of wireless communications that includes determining, by a user equipment, one or more random access procedure timelines based on a use case or a deployment case. Additionally, the method includes performing, by the user equipment, a configurable random access procedure according to the one or more random access procedure timelines based on the use case or the deployment case.

In an additional aspect, the present disclosure includes a method of wireless communications including transmitting, by a user equipment in an inactive or idle state, a first message on a physical random access channel, wherein the first message includes a random access preamble. Also, the method includes receiving, by the user equipment, a second message on a downlink channel in response to the first message, wherein the second message includes a request flexible transmission indicator and an uplink grant for the user equipment. Further, the method includes determining a conflict in a first resource for sending a request, and transmitting, by the user equipment, the request on an uplink channel based on the uplink grant and using a second resource based on the request flexible transmission indicator.

Moreover, the present disclosure also includes apparatus having components or configured to execute or means for executing the above-described methods, and computer-readable medium storing one or more codes executable by a processor to perform the above-described methods.

For example, in an aspect, the present disclosure includes an apparatus having a transceiver for communicating one or more wireless signals via one or more antennas, a memory configured to store instructions, and one or more processors communicatively coupled with the transceiver and the memory. The one or more processors are configured to receive a configuration indicating one or more parameters related to determining a random access procedure timeline, transmit, in an inactive or idle state, a first message on a physical random access channel, where the first message includes a random access preamble, receive a second message on a downlink channel in response to the first message, where the second message includes a temporary cell radio network temporary identifier and an uplink grant for the user equipment, transmit, based on the random access procedure timeline, a request on an uplink channel based on the uplink grant, and monitor a common search space of a downlink control channel for an acknowledgement message or a negative acknowledgement message corresponding to the request and identifiable based on the temporary cell radio network temporary identifier.

Additionally, in an aspect, the present disclosure includes an apparatus including means for receiving, by a user equipment, a configuration indicating one or more parameters related to determining a random access procedure timeline, means for transmitting, by the user equipment in an inactive or idle state, a first message on a physical random access channel, where the first message includes a random access preamble, means for receiving, by the user equipment, a second message on a downlink channel in response to the first message, where the second message includes a temporary cell radio network temporary identifier and an uplink grant for the user equipment, means for transmitting, by the user equipment and based on the random access procedure timeline, a request on an uplink channel based on the uplink grant, and means for monitoring, by the user equipment, a common search space of a downlink control channel for an acknowledgement message or a negative acknowledgement message corresponding to the request and identifiable based on the temporary cell radio network temporary identifier.

Moreover, in an aspect, the present disclosure includes a computer-readable medium storing computer code executable by a processor for wireless communications. The code includes code for receiving, by a user equipment, a configuration indicating one or more parameters related to determining a random access procedure timeline, code for transmitting, by the user equipment in an inactive or idle state, a first message on a physical random access channel, where the first message includes a random access preamble, code for receiving, by the user equipment, a second message on a downlink channel in response to the first message, where the second message includes a temporary cell radio network temporary identifier and an uplink grant for the user equipment, code for transmitting, by the user equipment and based on the random access procedure timeline, a request on an uplink channel based on the uplink grant, and code for monitoring, by the user equipment, a common search space of a downlink control channel for an acknowledgement message or a negative acknowledgement message corresponding to the request and identifiable based on the temporary cell radio network temporary identifier To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 10 is a flow diagram of an example of a method of performing a configurable NR RACH procedure based on a deployment scenario;

DETAILED DESCRIPTION

Figure 1:
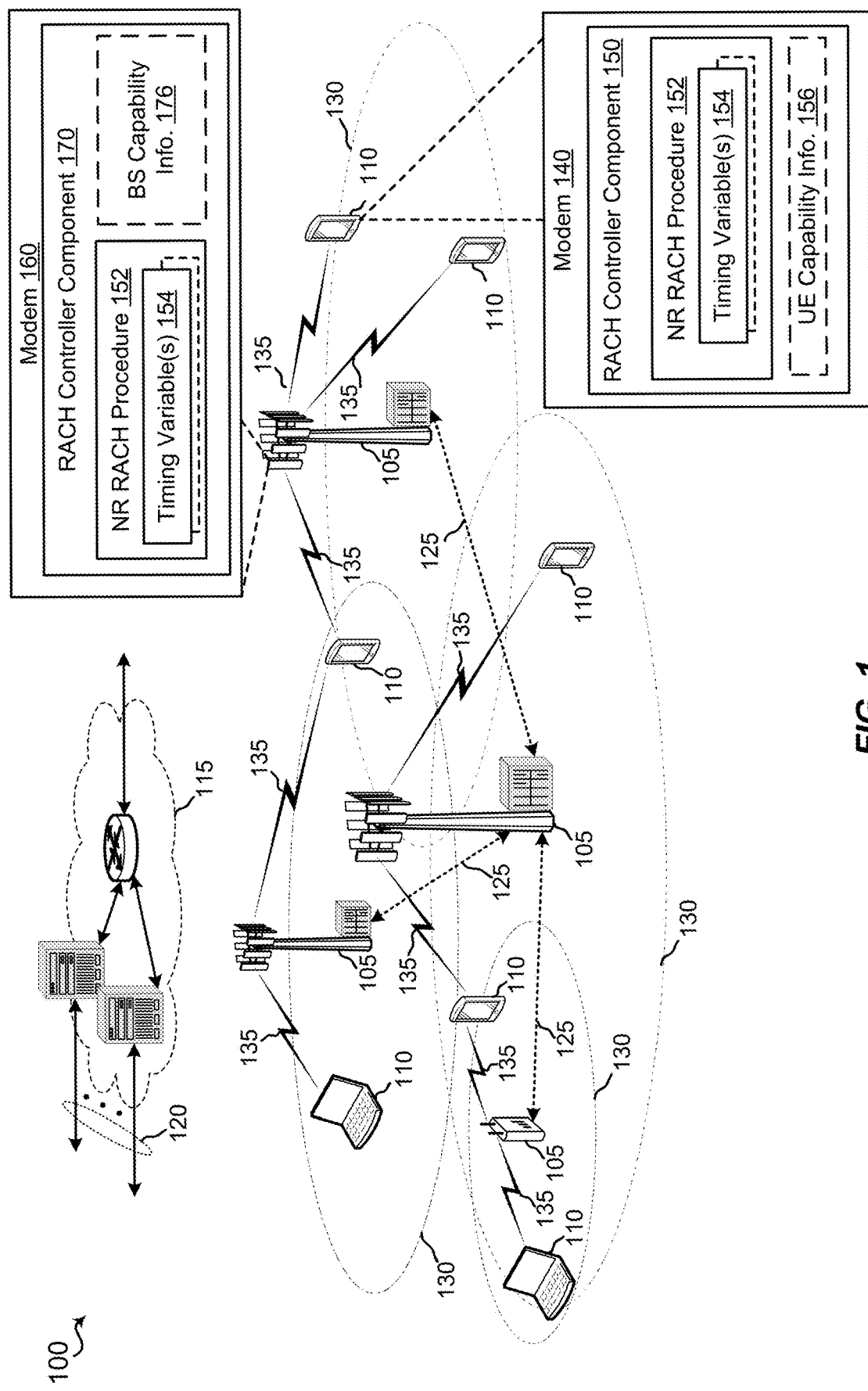
FIG. 1 is a schematic diagram of an example of a wireless communication network including at least one user equipment (UE) having a RACH controller component and at least one base station having a corresponding RACH controller component, both of which can be configured to execute a configurable new radio (NR) RACH procedure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates a configurable new radio (NR) RACH procedure that may be executed by a UE and a base station, resulting in a configurable RACH timeline that may be more efficient than existing RACH procedures and timelines. For example, the configurable NR RACH procedure may utilize one of multiple possible numerologies (e.g., sub-carrier spacing, cyclic prefix, slot duration) and/or timing variables (e.g., timing durations or delays between transmission or reception of different messages) depending on one or more of a particular use case (e.g., RRC state of UE, UE capability, base station capability, existing and/or desired numerology, existing and/or desired latency) and/or a particular deployment case (e.g., carrier frequency utilized, cell size). Further, the present disclosure may include additional features, such as use of a common search space of a physical downlink channel for exchanging control information and/or message acknowledgements, or such as the use of known reference timing to account for misalignment or delays in message transmission, to further enhance the configurable NR RACH procedure.

Additional features of the present aspects are described in more detail below with respect to FIGS. 1-13.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having a random access channel (RACH) controller component 150 that manages execution of a configurable new radio (NR; also referred to as 5G) RACH procedure 152, in communication with base station 105, resulting in one or more RACH timelines (e.g., a duration of one or more portions of NR RACH procedure 152) that may be more efficient (e.g., shorter in time) than prior RACH procedures (e.g., in LTE or 3G). For example, NR RACH procedure 152 may be configured with one or more different timing variables 154, or one or more different sets of timing variables 154, which are capable of altering RACH timeline. RACH controller component 150 may utilize the one or more different timing variables 154, or one or more different sets of timing variables 154, based on one or any combination of UE capability information 156, base station capability information 176, the given use case, or the given deployment case, as will be discussed below in more detail.

Further, wireless communication network 100 includes at least one base station 105 with a modem 160 having a RACH controller component 170 that manages execution of configurable NR RACH procedure 152, in communication with UE 110, resulting in a given one of the one or more RACH timelines. RACH controller component 170, independently or in combination with RACH controller component 150 of UE 110, may utilize the one or more different timing variables 154, or one or more different sets of timing variables 154, based on one or any combination of UE capability information 156, base station capability information 176, the given use case, or the given deployment case, as will be discussed below in more detail. Thus, according to the present disclosure, NR RACH procedure 152 may be configured in a manner that improves an efficiency of UE 110 in randomly accessing base station 105 and establishing a communication connection.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), media access control (MAC), etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
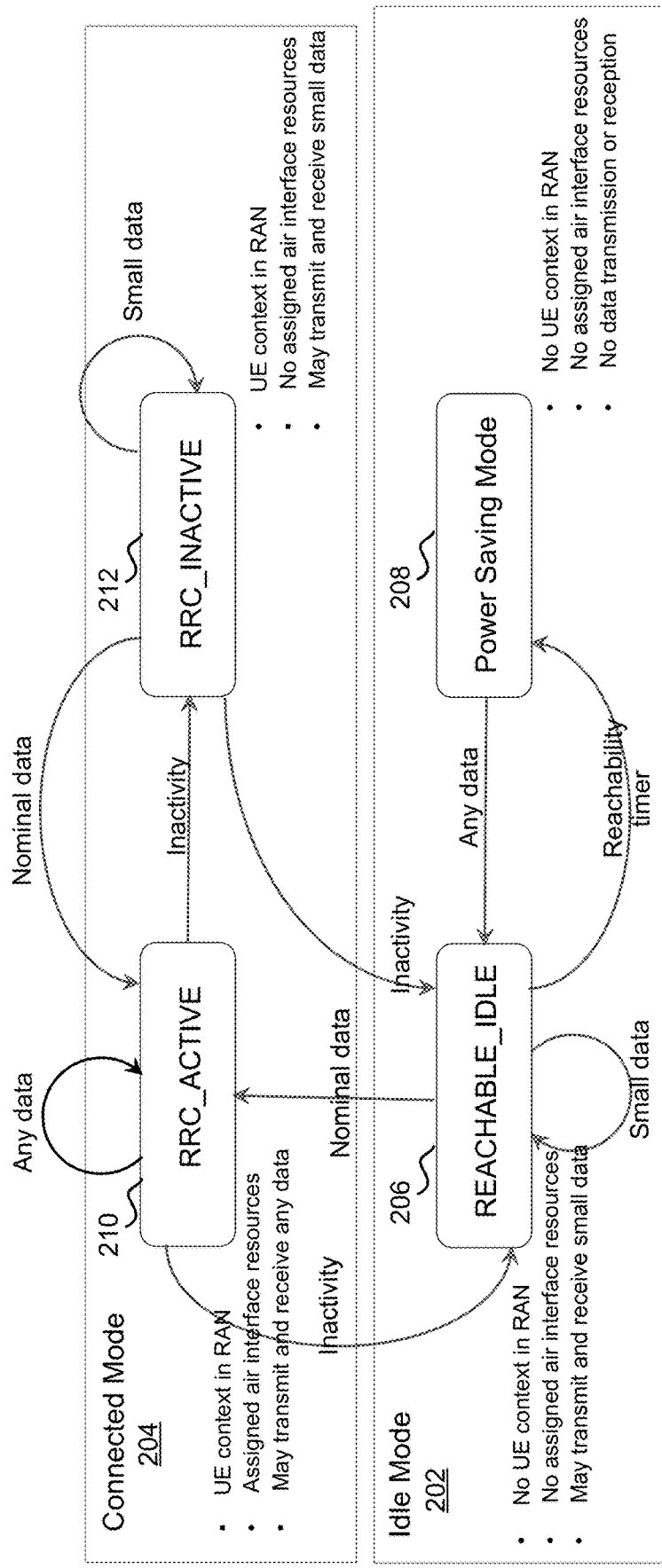
FIG. 2 is a state diagram of an example of possible NR radio resource control (RRC) states for a UE, in accordance with aspects described herein.

Referring to FIG. 2, UE 110 operating in wireless communication network 100 (FIG. 1) may be in one of multiple possible NR technology radio resource control (RRC) states 200, where UE 110 can utilize NR RACH procedure 152 to move from one or more non-active states into an active state. For example, in an aspect, each of the NR technology RRC states 200 may be associated with one of an idle mode 202 of operation of UE 110 or a connected mode 204 of operation of UE 110. In idle mode 202, RRC states 200 of UE 110 may include a Reachable_Idle state 206 and a Power Saving Mode 208. In connected mode 204, RRC states 200 of UE 110 may include an RRC_Active state 210 and an RRC_Inactive state 212. Various conditions or characteristics associated with each state, or with transitioning from one state to another, are listed in FIG. 2. In an example, the configurable RACH procedures described herein (e.g., NR RACH procedure 152) may be utilized to switch the UE 110 from an RRC_Inactive state 212 or a Reachable_Idle state 206 to the RRC_Active state 210.

Figure 3:
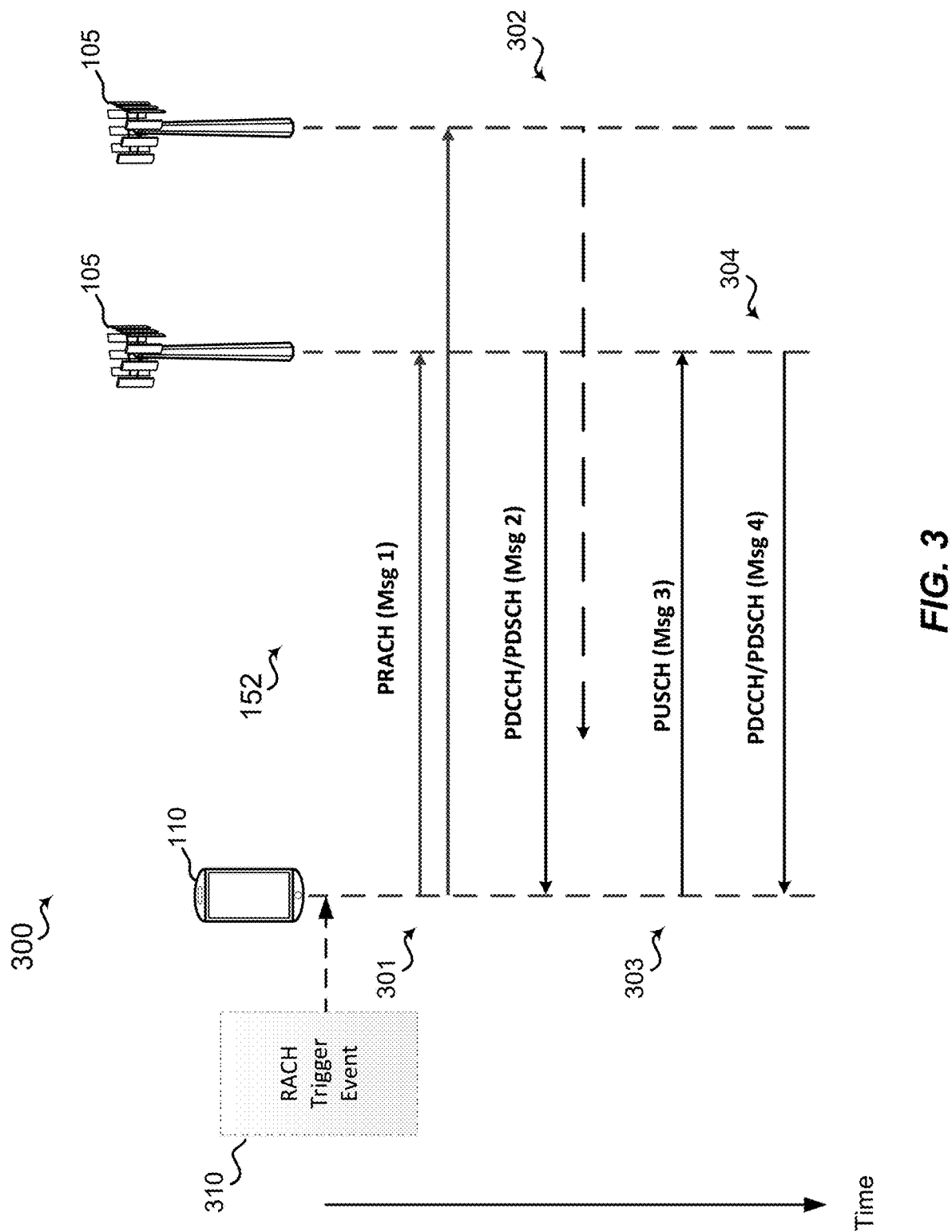
FIG. 3 is a message flow diagram of a 4-step message flow of an example implementation of a configurable NR RACH procedure, as described herein.

Referring additionally to FIG. 3 and Table 1 (below), during operation, UE 110 may execute an implementation of NR RACH procedure 152 of the present disclosure, according to a 4-step NR RACH message flow 300, due to one the occurrence of one or more RACH trigger events 310. Suitable examples of RACH trigger event 310 may include, but are not limited to: (i) an initial access from RRC_IDLE to RRC_CONNECTED ACTIVE; (ii) DL data arrival during RRC_IDLE or RRC_CONNECTED INACTIVE; (iii) UL data arrival during RRC_IDLE or RRC_CONNECTED INACTIVE; (iv) a handover during the connected mode of operation; and (v) a connection re-establishment.

NR RACH procedure 152 may be associated with a contention based random access, or with a contention free random access. In an implementation, a contention based NR RACH procedure 152 corresponds to the following RACH trigger events 310: an initial access from RRC_IDLE to RRC_CONNECTED ACTIVE; UL data arrival during RRC_IDLE or RRC_CONNECTED INACTIVE; and/or a connection re-establishment. In an implementation, a contention-free NR RACH procedure 152 corresponds to the following RACH trigger events 310: downlink (DL) data arrival during RRC_IDLE or RRC_CONNECTED INACTIVE; and/or a handover during the connected mode of operation.

On the occurrence of one or more of the above RACH trigger events 310, the execution of NR RACH procedure 152 may include 4-step NR RACH message flow 300 (see FIG. 3 and Table 1), where UE 110 exchanges messages with one or more base stations 105 to gain access to a wireless network and establish a communication connection.

TABLE 1

NR RACH procedure 152, including Messages and Message Content transmitted over corresponding Physical (PHY) channel(s).

| PHY Channel | Message | Message content |
| --- | --- | --- |
| PRACH | Msg 1 | RACH Preamble |
| PDCCH/PDSCH | Msg 2 | Detected RACH preamble ID, TA, TC-RNTI, backoff indicator, UL/DL grants |
| PUSCH | Msg 3 | RRC Connection request (or scheduling request and tracking area update) |
| PDCCH/PDSCH | Msg 4 | Contention resolution message |

At 301, for example, UE 110 may transmit a first message (Msg 1), which may be referred to as a random access request message, to one or more base stations 105 via a physical channel, such as a physical random access channel (PRACH). For example, Msg 1 may include one or more of a RACH preamble and a resource requirement.

At 302, one of more of the base stations 105 may respond to Msg 1 by transmitting a second message (Msg 2), which may be referred to as a random access response (RAR) message, over a physical downlink control channel (e.g., PDCCH) and/or a physical downlink shared channel (e.g., PDSCH). For example, Msg 2 may include one or more of a detected preamble identifier (ID), a timing advance (TA) value, a temporary cell radio network temporary identifier (TC-RNTI), a backoff indicator, an UL grant, and/or a DL grant.

At 303, in response to receiving Msg 2, UE 110 transmits a third message (Msg 3), which may be an RRC connection request or a scheduling request, via a physical uplink channel (e.g., PUSCH) based on the UL grant provided in Msg 2. In an aspect, Msg 3 may include a tracking area update (TAU), such as on a periodic basis or if UE 110 moves outside of one or more tracking areas (TAs) initially provided to UE 110 in a tracking area identifier (TAI) list. Also, in some cases, Msg 3 may include a connection establishment cause indicator, which can identify a reason for the UE 110 request to connect to the network.

At 304, in response to receiving Msg 3, base station 105 may transmit a fourth message (Msg 4), which may be referred to as a contention resolution message, to UE 110 via a physical downlink control channel (e.g., PDCCH) and/or a physical downlink shared channel (e.g., PDSCH). For example, Msg 4 may include a cell radio network temporary identifier (C-RNTI) for UE 110 to use in subsequent communications.

In the above description, a collision scenario was not discussed but a collision between two or more UEs 110 requesting access can occur. For instance, two or more UEs 110 may send Msg 1 having a same RACH preamble, since the number of RACH preambles may be limited and may be randomly selected by each UE in a contention-based NR RACH procedure 152. As such, each UE can receive the same temporary C-RNTI and the same UL grant, and thus each UE may send a similar Msg 3. In this case, base station 105 may resolve the collision in one or more ways: (i) both Msg 3 may interfere with each other, and so base station 105 may not send Msg 4, thus each UE can retransmit Msg 1; (ii) base station 105 may successfully decode only one Msg 3 and send an ACK message to that UE (e.g., as Msg 4 or a separate message); and/or (iii) base station 105 may successfully decode Msg 3 from both UEs, and then send a Msg 4 having a contention resolution identifier (e.g., an identifier tied to one of the UEs) to both UEs, in which case each UE can receive the Msg 4, decode it, and determine if the message is intended for the given UE by successfully matching or identifying the contention resolution identifier. It should be noted that such a problem may not occur in a contention-free NR RACH procedure 152, as in this case base station 105 can inform UE 110 of which RACH preamble to use.

Figure 4:
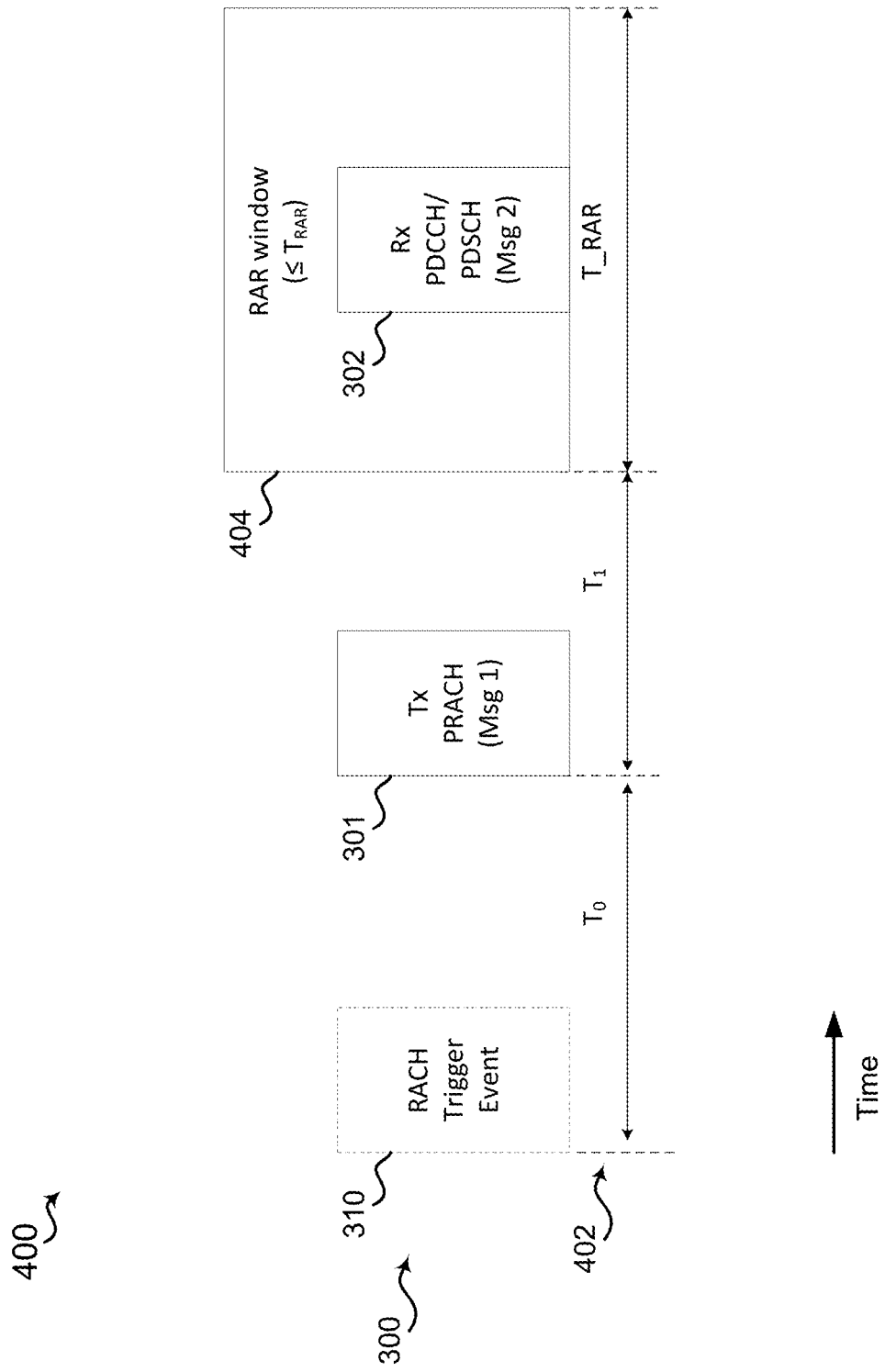
FIG. 4 is a portion of a RACH timeline associated with an example implementation of a configurable NR RACH procedure, as described herein.
Figure 5:
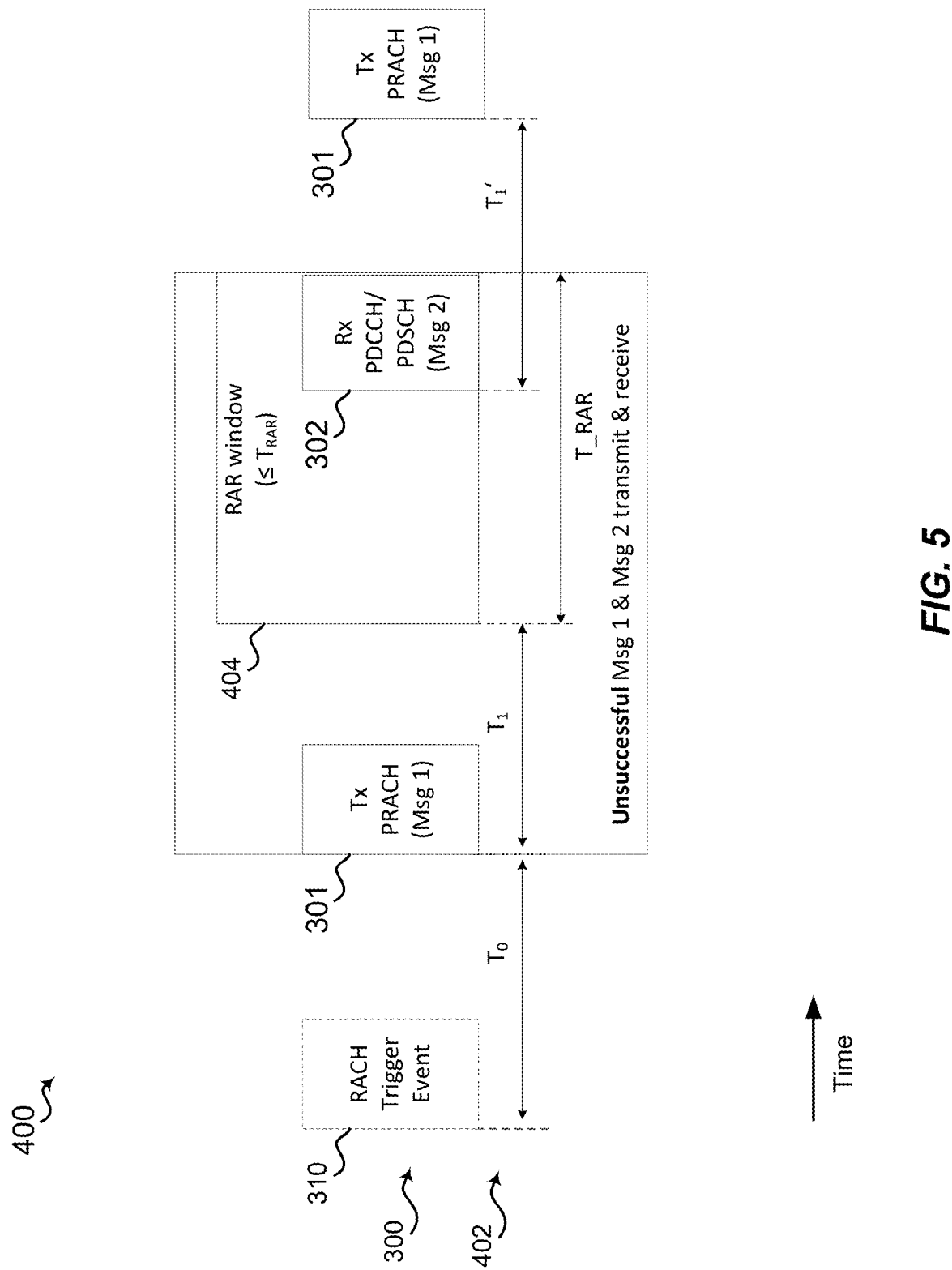
FIG. 5 is another portion of the RACH timeline associated with an example implementation of a configurable NR RACH procedure, as described herein.
Figure 6:
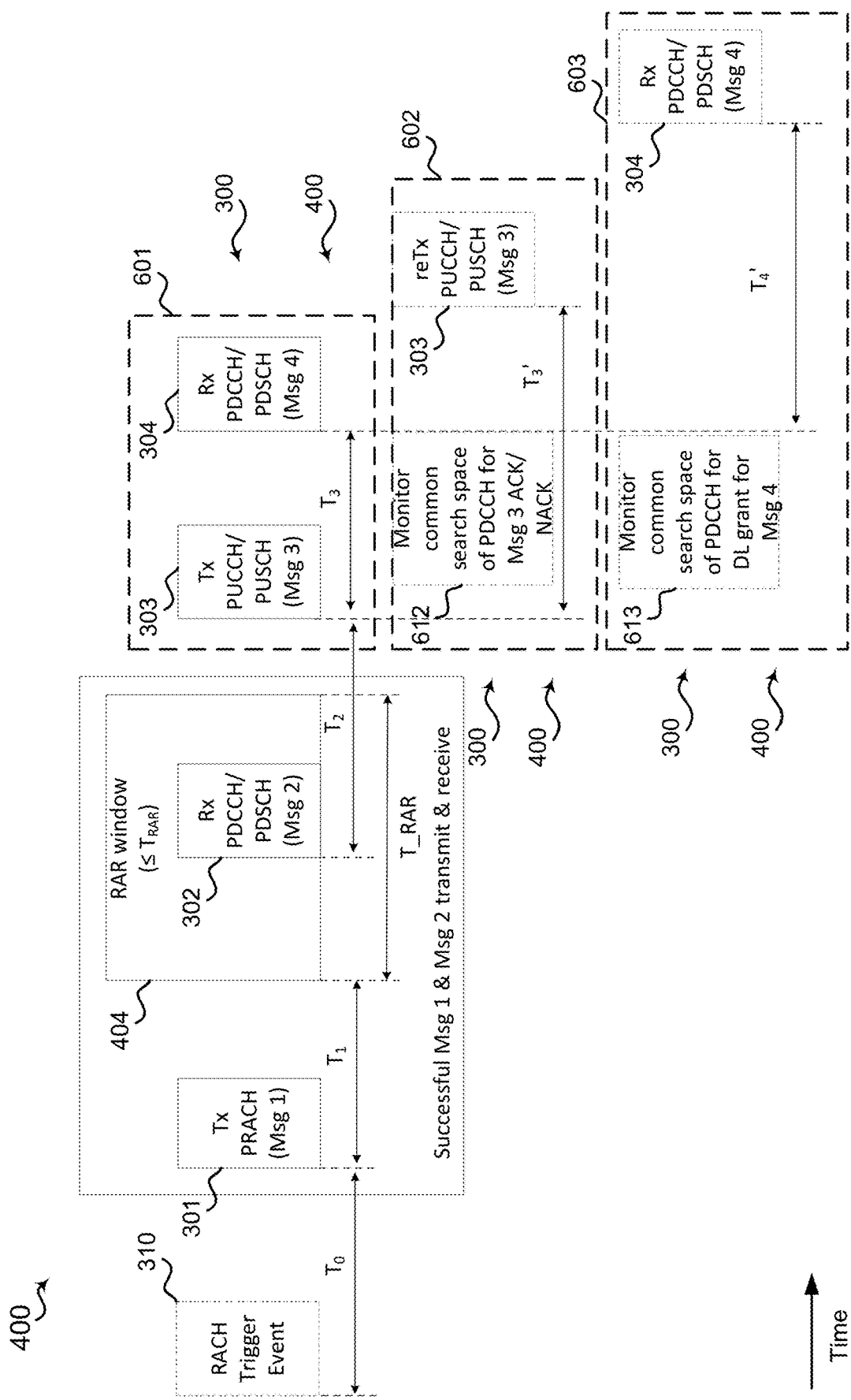
FIG. 6 is an example of a RACH timeline associated with an example implementation of a configurable NR RACH procedure, as described herein, including different optional timelines relating to successful transmission, reception, decoding, and/or retransmissions of certain ones of the messages.

Referring to FIGS. 4-6 and Table 2 (below), according to the present aspects, UE 110 and base station 105 executing NR RACH procedure 152 including the 4-step message flow 300 may result in a configurable RACH timeline 400 that is improved (e.g., having a reduced time in one or more of the message exchanges), for example, as compared to current RACH procedures in LTE, due to NR RACH procedure 152 being configurable by one or more timing variables 402.

It may be desirable to reduce a duration of one or more portions of NR RACH timeline 400, as compared to prior RACH procedure durations, in one or more situations. For example, in a situation when UE 110 initially attempts to access the network, it may be desirable to reduce the initial access time. For instance, when UE 110 transitions from idle state to active state, it may be beneficial to improve the RACH timeline 400, although some applications may not require any improvement. For instance, UE 110 operating according to ultra-reliable low latency communication (URLLC) specifications can go through a standard RACH procedure (e.g., at least based on standard RACH procedure durations), then once access is established, UE 110 can be configured to communicate according to URLLC standards. In another case, when UE 110 transitions from an inactive state to an active state, it may be desirable to improve the RACH timeline 400 to have the transition between inactive and active states be more seamless.

Additionally, for example, in a situation of handover of UE 110 from a serving base station to a target base station, it may be beneficial to reduce the RACH timeline 400 (e.g., where applications support both mobility and low latency). In such as case, then it may be important to optimize the RACH timeline 400.

Further, for example, in a situation of UL-based mobility of UE 110, it may be beneficial to reduce the RACH timeline 400, for instance during high speed movements of UE 110 and/or during communications with a small cell base station.

In one implementation of the present disclosure, in FIGS. 4-6, the configurable NR RACH procedure 152 including the 4-step message flow 300 may include one or more configurable timing variables 402 ($T_0$, $T_1$, $T_2$, $T_3$, $T_1'$, $T_2'$, and $T_3'$) that may be associated with each of the messages. Each of timing variables 402 may be configured individually or in different optional sets (see Table 2; e.g., LTE_like set, enhanced set, and aggressive set). As such, execution of NR RACH procedure 152 by UE 110 and base station 105 can result in different duration RACH timelines 400 depending on the value of the utilized timing variables 402.

For example, UE 110 and/or base station 105 may select one of the one or more sets (Table 2) of configurable timing variables 402 based on one or more considerations, such as but not limited to:

(i) maintaining a same or fixed timeline for all cases; and/or (ii) configuring different timelines for different cases, including:

(a) different RACH timelines (e.g., including different numerology (including, but not limited to sub-carrier spacing, cyclic prefix, and slot duration), at least for data and control, and/or different latency requirements, at least for data and control) for different use cases (e.g., based on different users having different processing capability; and/or based on different networks having different processing capability); and/or (b) different RACH timelines for different deployments (e.g., based on carrier frequency, such as but not limited to mmWave versus sub-6 GHz; and/or based on different cell size, such as but not limited to 100 km cells, small cells, home cells, and/or 35 km cell sizes).

Specifically, according to the present disclosure, the following timing variables 402 may be applied to the NR RACH procedure 152 including the 4-step message flow 300:

$T_0$ is a time delay from the RACH trigger event 310 to the reception of Msg 1;

$T_1$ is a time delay from the Msg 1 transmission to the beginning of a random access response (RAR) window 404, which has a time duration of T_RAR, wherein RAR window 404 is a time window in which Msg 2 may be transmitted and that allows base station 105 to distribute users, e.g., UEs;

$T_2$ is a minimum UE processing delay (in time) from the time the RAR message (Msg 2) is correctly decoded to the time where Msg 3 is transmitted, and the TA received in Msg 2 is accounted for or applied in $T_2$;

$T_3$ is a time duration from the time where Msg 3 is transmitted to the time where UE starts decoding Msg 4;

$T_1'$ is a maximum UE delay (in time) from the last subframe (SF) or slot of RAR window 404 to the SF or slot in which Msg 1 is retransmitted (e.g., in the case where UE 110 does not receive RAR message (Msg 2) successfully);

$T_3'$ is a maximum UE delay (in time) between Msg 3 retransmissions (e.g., HARQ round-trip-time (RTT), for example, up to a maximum of HARQs for Msg 3 303); and $T_4'$ is a maximum time delay between Msg 4 retransmissions.

TABLE 2

NR RACH procedure 152 Timeline Options

| Option | $T_1$ | $T_2$ | $T_3$ | $T_1'$ | $T_3'$ | $T_4'$ | $T_{RAR}$ |
|---|---|---|---|---|---|---|---|
| LTE_like timeline | 3 SF | 6 SF – TA | 4 SF | 4 SF | 8 SF | 8 SF | 10 SF |
| Enhanced timeline | 2 SF | 2 SF – TA | 2 SF | 2 SF | 4 slot | 4 slot | 5 SF |
| Aggressive timeline | 1 slot | 2 slot – TA | 1 slot | 1 slot | 2 slot | 2 slot | [5] slot |

LTE_like timeline can be based on timelines defined in 3GPP TS 36.321 section 5.1.4 and TS 36.213 section 6.1.1; SF is fixed to a reference duration; slot duration can vary dependent on numerology. $T_1'$ in the LTE_like set of timing variables 402 can start with default/fixed numerology then transition to different numerology during NR RACH procedure 152. The value of $T_1'$ may vary depending on a number or a reason for retransmission of Msg 2 302, e.g., if UE 110 could decode RAR message (Msg 2) 302 but RAR message (Msg 2) 302 is not correct, then $T_1'=5$ slots. The aggressive timeline can be used for use with small cell deployments with the highest capability base stations and the highest capability UEs, for example, and/or for a contention-free NR RACH procedure 152. In addition, the aggressive timeline can have NR RACH procedure 152 following different numerology, for instance, slot duration is a function of numerology, e.g., URLLC has a slot duration of 250 usec. Moreover, for example, the values of timing variables 402 for each timeline option (e.g., LTE_like, enhanced, and aggressive) of NR RACH procedure 152, and the number of different optional sets, may vary and may be configured by each wireless communication system operator implementing the present disclosure.

Additionally, while FIGS. 4-6 represent one example of the various timing variables 402 ($T_0$, $T_1$, $T_2$, $T_3$, $T_1'$, $T_2'$, and $T_3'$) as beginning at the start of an event (e.g., at the beginning of RACH trigger event 310, at the beginning of transmission of Msg 1 or Msg 3, at the beginning of reception of Msg 2 or Msg 4), the beginning of the duration of each timing variable 402 may be measured from some other point in time. For instance, the beginning of the time period for each timing variable 402 may be measured from the end of an event, or from some other point in time (middle of an event; timing offset from beginning or end of an event) that can be associated with or determined for an event.

Additionally, referring specifically to FIG. 4, in some implementations of the present disclosure, multiple transmissions of Msg 2 302 may be present within RAR window 404 (e.g., depending on network implementation). For instance, base station 105 may send more than one RAR message (Msg 2) 302 per UE 110 within RAR window 404, such as for redundancy. Also, for instance, base station 105 may send different RAR messages (Msg 2) 302 for each of multiple UEs within RAR window 404, such as to enable base station 105 to serve multiple UEs. In such cases, according to one implementation of the present disclosure, UE 110 may not combine multiple transmission occasions (e.g., multiple received Msg 2s) when decoding Msg 2 302. Instead, UE 110 transmits Msg 1 301, starts to monitor RAR window 404 after $T_1$, and decodes Msg 2 302 successfully if the decoded Msg 2 302 is the correct message, e.g., the Msg 2 302 intended for UE 110 (and not for another UE) based on a matching RACH preamble, and/or a first successfully decoded one of multiple redundant Msg 2s 302 transmitted to UE 110.

Referring specifically to FIG. 5, in some cases, Msg 1 301 may be retransmitted when UE 110 is unable to receive Msg 2 302 successfully within RAR window 404. For example, if UE 110 gets to a last SF of RAR window 404 and is not able to successfully decode Msg 2 302, then UE 110 waits $T_1'$ and then retransmits Msg 1 301. In an aspect, UE 110 may be configured (e.g., based on a specification, based on receiving configuration information from the network, such as in a system information block (SIB) or master information block (MIB) transmitted by base station 105, dedicated control signaling, RRC or other higher layer signaling, etc.) with a maximum number of retransmissions of Msg 1 301. Also, in some cases, UE 110 may increase a transmission power of one or more (e.g., each) subsequent retransmission of Msg 1 301, e.g., in an attempt to enable base station 105 to better receive the message. As such, UE 110 may transmit one or more (e.g., each) successive Msg 1 301 with power ramping (e.g., based on a valued defined by a specification or provided by the network/base station 105). Additionally, in some aspects, the values of $T_1$ and $T_1'$ can be randomly selected or specified to avoid collision between different UEs.

Referring specifically to FIG. 6, according to this disclosure, in performing NR RACH procedure 152, UE 110 and base station 105 may utilize a common search space of a physical control channel, such as a physical downlink control channel (PDCCH), for messaging relating to message flow 300. In an aspect, UE 110 may monitor a common search space of the PDCCH for an acknowledgement message or negative acknowledgement message transmitted by base station 105 and corresponding to receipt of Msg 3 303 at base station 105. In another aspect, UE 110 may monitor a common search space of the PDCCH for receipt of a DL grant for receiving Msg 4 304 transmitted by base station 105. In this aspect, the DL grant for Msg 4 304 received by UE 110 on the common search space of the PDCCH may be an alternative manner for delivering this DL grant, e.g., instead of including this DL grant in Msg 2 302.

In operation, for example, in a first use case 601 where the DL grant is delivered in Msg 2 302 and all messages are successfully received and decoded, then UE 110 may not need to utilize (at least with respect to aspects relating to retransmissions of Msg 3 and Msg 4) the common search space of the PDCCH. For instance, after successful transmission of Msg 1 301 and successful reception of Msg 2 302 by UE 110, UE 110 may successfully transmit Msg 3 303, e.g., on resources provided in the UL grant received in Msg 2 302. Further, UE 110 may successfully receive and decode Msg 4 304, e.g., on resources provided in the DL grant received in Msg 2 302. Thus, the timeline corresponding to first use case 601 represents a successful timeline without any retransmissions.

Alternatively, in a second use case 602, UE 110 may monitor the common search space of the PDCCH for an ACK/NACK of Msg 3 303. For instance, after successful transmission of Msg 1 301 and successful reception of Msg 2 302 by UE 110, and after transmitting Msg 3 303, UE 110 may monitor the common search space of the PDCCH. Specifically, UE 110 may perform this monitoring, such as during a monitor window 612, to listen for an acknowledgement message or negative acknowledgement message transmitted by base station 105, corresponding to receipt of Msg 3 303 at base station 105. In an aspect, monitor window 612 may have a specific time duration (e.g., a SF, a slot, or one or more symbols or less), known by or otherwise configured for the UE 110, beginning at some time after transmission of Msg 3 303 (e.g., in a next SF, slot, or one or more symbols or less). For example, base station 105 may scramble or otherwise encode the acknowledgement message or the negative acknowledgement message with the TC-RNTI of UE 110 so that UE 110 can determine that the message is intended for UE 110 (e.g., by descrambling the message based on the TC-RNTI). If a negative acknowledgement message or no acknowledgement message is received after performing this monitoring during monitor window 612, then UE 110 may retransmit Msg 3 303, for instance (e.g., after waiting a delay time, such as $T_3'$).

In another alternative, in a third use case 603, UE 110 may monitor the common search space of the PDCCH for the DL grant of the resources to use for receiving Msg 304 (also referred to as Msg 4 DL grant), e.g., when such Msg 4 DL grant is not received in Msg 2 302. For instance, after successful transmission of Msg 1 301 and successful reception of Msg 2 302 by UE 110 (without receiving DL grant), and after transmitting Msg 3 303, UE 110 can monitor the common search space of the PDCCH in this example. Specifically, in this example, UE 110 may perform this monitoring, such as during a monitor window 613, for the Msg 4 DL grant from base station 105. For example, base station 105 may scramble or otherwise encode the DL grant (that identifies DL resources for UE 110 to use for receiving Msg 4 304) with the TC-RNTI of UE 110 so that UE 110 can determine that the message is intended for UE 110. In an aspect, monitor window 613 may have a specific time duration (e.g., e.g., a SF, a slot, or one or more symbols or less), known by or otherwise configured for the UE 110, beginning at some time after transmission of Msg 3 303 (e.g., in a next SF, slot, or one or more symbols or less). Upon receipt and successful decoding of the Msg 4 DL grant received in the common search space of the PDCCH, UE 110 may transmit an acknowledgement message to base station 105 on a physical control channel, such as a physical uplink control channel (PUCCH). If UE 110 receives but cannot successfully decode the Msg 4 DL grant, or after performing this monitoring during monitor window 613 without receiving the Msg 4 DL grant, then UE 110 may transmit a negative acknowledgement message to base station 105 on a physical control channel, such as the PUCCH. In response to receiving the negative acknowledgement message, or no acknowledgement message, corresponding to the Msg 4 DL grant, base station 105 may retransmit the Msg 4 DL grant in the common search space of the PDCCH. Additionally, in some cases, base station 105 may wait a delay time, e.g., $T_4'$, before retransmitting Msg 4 304.

Figure 7:
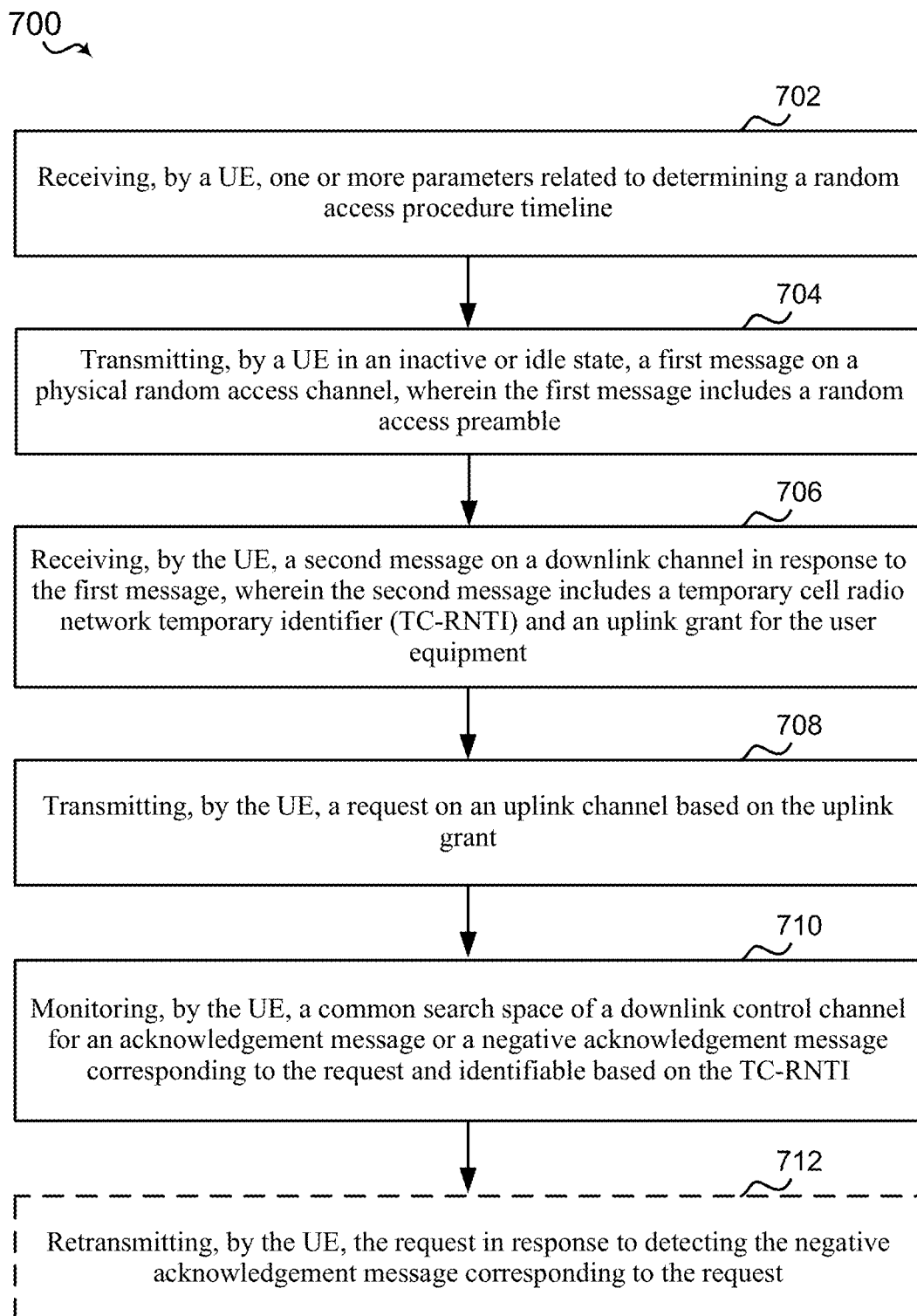
FIG. 7 is a flow diagram of an example of a method of performing a NR RACH procedure where a UE can monitor a common search space for an acknowledgement (ACK) or negative ACK (NACK) corresponding to a RACH request.

Referring to FIG. 7, for example, a method 700 of wireless communication in operating UE 110 according to the above-described aspects to monitor a common search space of a downlink control channel for an ACK or NACK of Msg 3 303 includes one or more of the above-defined actions.

For example, at 702, method 700 includes receiving, by a user equipment, one or more parameters related to determining a configuration indicating a random access procedure timeline. For instance, in an aspect, UE 110 may execute RACH controller component 150 and/or NR RACH procedure 152 to receive the one or more parameters for determining the configuration, e.g., from a specification, from a configuration stored at the UE 110, from the base station 105, etc. In one example, UE 110 can retrieve the one or more parameters (or the configuration) from memory (e.g., memory 1316 in FIG. 12), or may otherwise determine the configuration based on one or more UE capability parameters stored in memory (e.g., memory 1216). For example, the one or more UE capability parameters may relate to whether the UE 110 supports a self-contained slot, as described herein, a frequency band configured for the UE 110 (e.g., by the base station 105), a processing capability of the UE 110, a latency requirement of the UE 110, etc. In an example, the UE 110 may receive the one or more parameters as part of the RACH procedure and/or may transmit an indication of the one or more UE capability parameters to the base station 105 as part of the RACH procedure. Thus, for example, the UE 110 may receive the one or more parameters after one or more of the other blocks in method 700.

In another example, UE 110 may perform a RACH procedure into the network using Msg 1 and Msg 2 with the fixed numerology and reference timing, described above and further herein, but then UE 110 and base station 105 may update configurations for different data/control numerology and/or different timeline settings (e.g., timing variables 402, e.g., $T_2$, $T_3$, $T_1'$, $T_2'$, and $T_3'$) for Msg 3 and Msg 4. The updated numerology and/or timing information for Msg 3 and Msg 4 may be carried in Msg 2, for example, and thus the UE 110 may receive the one or more parameters in Msg 2 from the base station 105 (or in other MIB and/or SIB, dedicated control signaling, RRC or other higher layer signaling, or other configuration messaging, etc.). In another example, the UE 110 may receive the one or more parameters as base station capability information transmitted from the base station 105 to UE 110 for determining the numerology and/or timeline, such as via an indication in MIB and/or SIB, dedicated control signaling, RRC or other higher layer signaling, or other configuration messaging, etc. The base station capability information may correspond to a carrier frequency of the base station 105, a class of the base station 105 (e.g., macrocell, femtocell, etc.), a processing capability of the base station 105 and/or corresponding network, etc. Further, UE 110 may provide base station 105 with UE capability information, such as in RRC connection setup stage message such as Msg 1, as described above. Accordingly, UE 110 and base station 105 may identify a common, compatible numerology and/or timing that may be more efficient than the fixed numerology and reference timing based on comparing capabilities.

In one example, based on receiving the UE capability information, the UE 110 can receive the configuration as instruction from the base station 105 to use a different numerology or RACH timeline (e.g., in Msg 2 where the base station 105 receives the capability information in Msg 1). In another example, UE 110 may otherwise determine the numerology or RACH timeline to use based on the UE capability information transmitted to the base station 105 (e.g., for transmitting Msg 3 where the UE indicates capability information in Msg 1).

At 704, method 700 includes, for example, transmitting, by a user equipment in an inactive or idle state, a first message on a physical random access channel, wherein the first message includes a random access preamble. For instance, in an aspect, UE 110 may execute RACH controller component 150 and/or NR RACH procedure 152 to transmit Msg 1 301 via a transmitter (e.g., transmitter 1208, FIG. 12), as described herein.

Additionally, at 706, method 700 includes receiving, by the user equipment, a second message on a downlink channel in response to the first message, wherein the second message includes a temporary cell radio network temporary identifier and an uplink grant for the user equipment. For instance, in an aspect, UE 110 may execute RACH controller component 150 and/or NR RACH procedure 152 to receive Msg 2 302 via a receiver (e.g., receiver 1206, FIG. 12), as described herein.

Further, at 708, method 700 includes transmitting, by the user equipment, a request on an uplink channel based on the uplink grant. For instance, in an aspect, UE 110 may execute RACH controller component 150 and/or NR RACH procedure 152 to transmit Msg 3 303 via a transmitter (e.g., transmitter 1208, FIG. 12), as described herein.

Additionally, at 710, method 700 includes monitoring, by the user equipment, a common search space of a downlink control channel for an acknowledgement message or a negative acknowledgement message corresponding to the request and identifiable based on the temporary cell radio network temporary identifier. For instance, in an aspect, UE 110 may execute RACH controller component 150 and/or NR RACH procedure 152 to receive an ACK/NACK of Msg 2 302 via a receiver (e.g., receiver 1206, FIG. 12) listening to a common search space of a PDCCH, as described herein.

Optionally, at 712, method 700 may include retransmitting, by the user equipment, the request in response to detecting the negative acknowledgement message corresponding to the request. For instance, in an aspect, UE 110 may execute RACH controller component 150 and/or NR RACH procedure 152 to retransmit Msg 3 303 via a transmitter (e.g., transmitter 1208, FIG. 12), as described herein.

Figure 8:
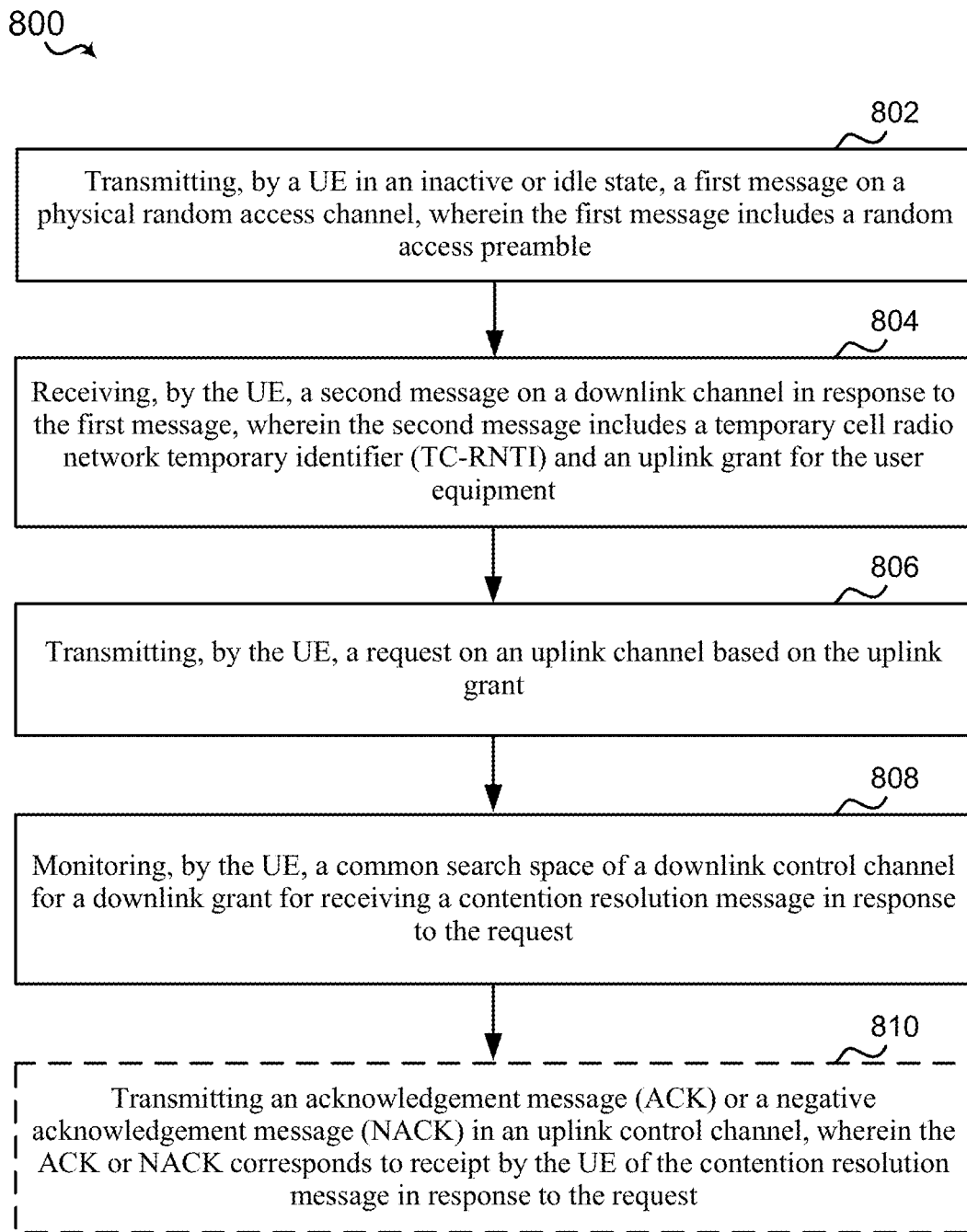
FIG. 8 is a flow diagram of an example of a method of performing a NR RACH procedure where a UE can receive a contention resolution message in response to a RACH request.

Referring to FIG. 8, for example, a method 800 of wireless communication in operating UE 110 according to the above-described aspects to monitor a common search space of a downlink control channel for DL grant for receiving Msg 4 304 includes one or more of the above-defined actions.

For instance, at 802, method 800 includes transmitting, by a user equipment in an inactive or idle state, a first message on a physical random access channel, wherein the first message includes a random access preamble. For instance, in an aspect, UE 110 may execute RACH controller component 150 and/or NR RACH procedure 152 to transmit Msg 1 301 via a transmitter (e.g., transmitter 1208, FIG. 12), as described herein.

At 804, method 800 includes receiving, by the user equipment, a second message on a downlink channel in response to the first message, wherein the second message includes a temporary cell radio network temporary identifier and an uplink grant for the user equipment. For instance, in an aspect, UE 110 may execute RACH controller component 150 and/or NR RACH procedure 152 to receive Msg 2 302 via a receiver (e.g., receiver 1206, FIG. 12), as described herein. In addition, the second message may include one or more parameters or a configuration related to determining the RACH timeline or numerology for a remainder of the RACH procedure (e.g., for transmitting Msg 3 and Msg 4, as described above), where the one or more parameters may indicate the numerology or RACH timeline, one or more parameters (e.g., base station capability information) for determining the RACH timeline or corresponding numerology, etc.

At 806, method 800 includes transmitting a request on an uplink channel based on the uplink grant. For instance, in an aspect, UE 110 may execute RACH controller component 150 and/or NR RACH procedure 152 to transmit Msg 3 303 via a transmitter (e.g., transmitter 1208, FIG. 12), as described herein.

Additionally, at 808, method 800 includes monitoring, by the user equipment, a common search space of a downlink control channel for a downlink grant for receiving a contention resolution message in response to the request. For instance, in an aspect, UE 110 may execute RACH controller component 150 and/or NR RACH procedure 152 to receive Msg 4 DL grant via a receiver (e.g., receiver 1206, FIG. 12) listening to a common search space of a PDCCH, as described herein.

Optionally, at 810, method 800 may further include transmitting an acknowledgement message or a negative acknowledgement message in an uplink control channel, wherein the acknowledgement message or the negative acknowledgement message corresponds to receipt by the user equipment of the contention resolution message in response to the request. For instance, in an aspect, UE 110 may execute RACH controller component 150 and/or NR RACH procedure 152 to transmit an ACK/NACK message for Msg 4 304 over a PUCCH via a transmitter (e.g., transmitter 1208, FIG. 12), as described herein.

According to the present aspects and as mentioned above, a timeline design of NR RACH procedure 152 may take into account one or more design considerations. For instance, in a first approach, a same RACH timeline may be used for all cases, at least for some initial portion of NR RACH procedure 152 (e.g., for Msg 1 and Msg 2). Though implementation of this design may be less complex than other designs, the design may be limited by the worst capability users and worst deployment scenarios (e.g., a timeline that allows for operability with low capability users and/or deployment scenarios may hinder throughput and/or experience for high capability users and/or deployment scenarios). Thus, in a second approach, UE 110 and base station 105 may be configured to support different RACH timelines for different scenarios. For instance, in a first case, different RACH timelines may be used for different use cases, such as but not limited to: different numerology and slot duration, at least for data and control; different latency requirements, at least for data and control; different users can have different processing capability; and different networks can have different processing capability. Alternatively, or in addition, in a second case, different RACH timelines may be used for different deployments, such as: different carrier frequency, e.g. mmWave vs. sub-6 GHz; and different cell size, e.g. 100 km cells vs. small cells.

For example, according to the first approach of a fixed RACH timing design, regardless of data/control channel numerology, UE 110 and base station 105 may always perform NR RACH procedure 152 with the fixed numerology and reference timing. In some scenarios, UE 110 and base station 105 may perform the entire NR RACH procedure 152 with the fixed numerology and reference timing. In other scenarios, however, UE 110 and base station 105 may perform only a portion of NR RACH procedure 152 with the fixed numerology and reference timing, and then may switch to a different numerology and/or timing for a remainder of NR RACH procedure 152 once UE receives updated numerology and/or timing information from the network. For instance, UE 110 may perform a RACH procedure into the network using Msg 1 and Msg 2 with the fixed numerology and reference timing, but then UE 110 and base station 105 may have their configurations updated for different data/control numerology and/or different timeline settings (e.g., timing variables 402, e.g., $T_2$, $T_3$, $T_1'$, $T_2'$, and $T_3'$) for Msg 3 and Msg 4. The updated numerology and/or timing information for Msg 3 and Msg 4 may be carried in Msg 2. In order to determine the updated configuration, base station 105 may provide base station capability information to UE 110, such as via an indication in MIB and/or SIB, dedicated control signaling, RRC or other higher layer signaling, or other configuration messaging. Further, UE 110 may provide base station 105 with UE capability information, such as in RRC connection setup stage message such as Msg 1. Accordingly, UE 110 and base station 105 may identify a common, compatible numerology and/or timing that may be more efficient than the fixed numerology and reference timing based on comparing capabilities. In one example, the base station 105, based on receiving the UE capability information, can instruct the UE 110 to use a different numerology or RACH timeline (e.g., in Msg 2 where the base station 105 receives the capability information in Msg 1). In another example, UE 110 may otherwise determine the numerology or RACH timeline to use based on the UE capability information transmitted to the base station 105 (e.g., for transmitting Msg 3 where the UE indicates capability information in Msg 1).

Figure 9:
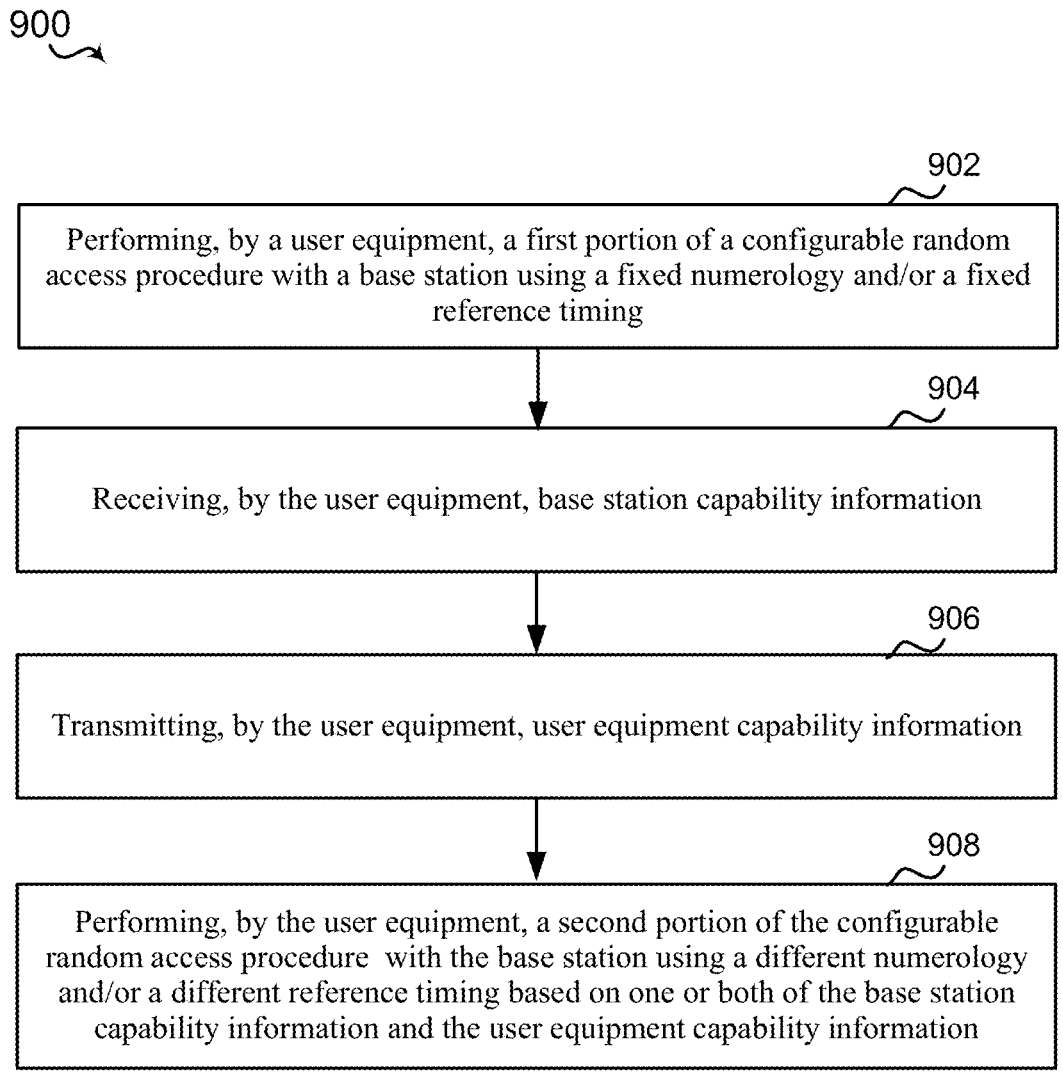
FIG. 9 is a flow diagram of an example of a method of performing a configurable NR RACH procedure using numerology or reference timing based on UE or base station capability information.

Referring to FIG. 9, in one example of operation of UE 110 using a fixed RACH timing design, a method 900 of wireless communications performed by UE 110 includes one or more of the above-defined actions.

For instance, at 902, method 900 includes performing, by a user equipment, a first portion of a configurable random access procedure with a base station using a fixed numerology and/or a fixed reference timing. For instance, in an aspect, UE 110 may execute RACH controller component 150 and/or NR RACH procedure 152 to transmit Msg 1 301 via a transmitter (e.g., transmitter 1208, FIG. 12) and receive Msg 2 302 via a receiver (e.g., receiver 1206, FIG. 12).

At 904, method 900 includes receiving, by the user equipment, base station capability information. For instance, in an aspect, UE 110 may execute RACH controller component 150 and/or NR RACH procedure 152 to receive base station capability information, e.g., in a MIB and/or SIB message, dedicated control signaling, RRC or other higher layer signaling, or other configuration messaging, via a receiver (e.g., receiver 1206, FIG. 12).

At 906, method 900 includes transmitting, by the user equipment, user equipment capability information. For instance, in an aspect, UE 110 may execute RACH controller component 150 and/or NR RACH procedure 152 to transmit UE capability information in Msg 1 301 and/or Msg 3 303 via a transmitter (e.g., transmitter 1208, FIG. 12).

Additionally, at 908, method 900 includes performing, by the user equipment, a second portion of the configurable random access procedure with the base station using a different numerology and/or a different reference timing based on one or both of the base station capability information and the user equipment capability information. For instance, in an aspect, UE 110 may execute RACH controller component 150 and/or NR RACH procedure 152 to transmit and/or receive subsequent messages (e.g., any messages after Msg 1 301 or after Msg 3, depending on when UE capability information is transmitted to base station 105). For example, the UE 110 can be configured to determine one or more parameters for performing the configurable random access procedure (e.g., RACH timeline parameters) based on the indicated base station and/or UE capability information.

Further, for example, according to the second approach of approach of a configurable RACH timeline 400, the duration of RACH timeline 400 may be different for different use cases or for different deployment cases (e.g., different for different indicated base station or UE capability information). In the scenario of the RACH timeline 400 being different for different use cases, a first case may include initially using a reference numerology and/or timing variables 402, and then changing to a configurable numerology and/or timing variables 402. For instance, in a first use case, before UE 110 and base station 105 exchange capability information, such as processing capability, NR RACH procedure 152, and hence the RACH timeline 400, can follow a reference numerology and/or timing variables 402. An example of this scenario may be when UE 110 performs NR RACH procedure 152 when transitioning from RRC-IDLE to RRC-CONNECTED states.

In a second use case, for example, when UE 110 and base station 105 already have knowledge on data/control channel numerology, a duration and/or timing variables 402 of RACH timeline 400 depend on the numerology configured for the data/control channel of the known numerology. An example of this scenario may be when UE 110 performs NR RACH procedure 152 when transitioning to the target base station 105 in a handover (HO) procedure, where the data/control channel numerology of the target base station 105 could be signaled to UE 110 in a HO command (e.g., transmitted by the base station 105 or the target base station to the UE 110 instructing the UE 110 to handover to the target base station and/or to begin one or more processes related to handing over to the target base station).

In the context of using different numerology and/or timing variables 402 with RACH timeline 400 for different deployment cases, the RACH timeline 400 may vary depending on, for instance, a frequency band of communications or a cell size of a cell with which UE 110 is communicating, which can be determined by the UE 110 and/or base station 105 or otherwise indicated in configuration information from the base station 105, etc. Thus, for example, there may be multiple RACH timelines 400 for each of multiple frequency bands. In an example, the multiple frequency bands and association with the RACH timelines 400 may be configured at the UE 110, such that the UE 110 can determine a RACH timeline 400 based on the frequency band configured for the UE 110 by the base station 105.

For instance, in the frequency band scenario, UE 110 and base station 105 may follow a first RACH timeline 400 having one set of numerology and/or timing variables 402 for one set of frequency bands, e.g. above 40 GHz, UE 110 and base station 105 may follow a second RACH timeline 400 (that is different from the first RACH timeline) having another, different set of numerology and/or timing variables 402 for another set of frequency bands, e.g., lower frequency bands. It should be noted that there may be any number of different RACH timelines 400 and corresponding frequency bands.

Also, for example, for the cell size scenario, UE 110 and base station 105 may follow a first RACH timeline 400 having one set of numerology and/or timing variables 402 for large cells, e.g. 100 km coverage cells, and UE 110 and base station 105 may follow a second RACH timeline 400 having one set of numerology and/or timing variables 402 for other sized cells, e.g., macro cells having less than 100 km coverage, and/or small cells having coverage measured in 10 s of meters. For example, the UE 110 can be configured with the appropriate timeline (e.g., from base station 105) and/or parameters for determining the timeline (e.g., cell or base station class or size). Thus, for example, there may be multiple RACH timelines 400 for each of multiple cell sizes or cell classes (e.g., macrocell, femtocell, etc.). In an example, the multiple cell sizes and association with the RACH timelines 400 may be configured at the UE 110, such that the UE 110 can determine a RACH timeline 400 based on the determined cell size of the serving cell (or target cell in the case of handover).

In the above-described configurable RACH timeline 400 examples, in some implementations, UE 110 can provide a UE capability to base station 105 in RACH messages, such as Msg 1 or Msg 3 in 4-step message flow 300. In an aspect, the UE capability may include, but is not limited to, a UE processing capability, whether UE 110 can support a self-contained slot (e.g., a slot having both UL and DL resources such that UE 110 can receive downlink control information and/or data and can transmit uplink control information and/or data in the same slot) or not, whether UE 110 can support one or more timing variables 402, etc. After base station 105 receives UE capability information from UE 110, then base station 105 and UE 110 can determine a match and/or can negotiate a different numerology and/or timing variables 402 (as compared to a reference) to reconfigure NR RACH procedure 152 and the corresponding RACH timeline 400, and thus may communicate with an enhanced processing timeline. Accordingly, procedures after the initial access by UE 110 to the network can use the enhanced processing timeline, leading to reduced turn-around times.

Referring to FIG. 10, in one example of operation of UE 110 using a configurable RACH timing design, a method 1000 of wireless communications performed by UE 110 includes one or more of the above-defined actions.

For instance, at 1002, method 1000 includes determining, by a user equipment, one of a plurality of random access procedure timelines based on a use case or a deployment case. For instance, in an aspect, UE 110 may execute RACH controller component 150 and/or NR RACH procedure 152 to determine one or more RACH timelines 400, e.g., using different individual or sets of timing variables 402 and/or different numerologies.

Additionally, at 1004, method 1000 includes performing, by the user equipment, a configurable random access procedure according to the one of the plurality of random access procedure timelines based on the use case or the deployment case. For instance, in an aspect, UE 110 may execute RACH controller component 150 to perform the configured NR RACH procedure 152.

For example, in an aspect, the one of the plurality of random access procedure timelines is associated with the user equipment being in an inactive state of a connected mode, and the configurable random access procedure may include a current numerology associated with a base station with which the user equipment is connected.

In another example, the one of the plurality of random access procedure timelines 400 is associated with a handover of the user equipment to a target base station, and the configurable random access procedure may include a target numerology associated with the target base station (e.g., a numerology used by the target base station for communicating over data and/or control channels).

In a further example, the one of the plurality of random access procedure timelines 400 is associated with a frequency band of communications for a base station that the user equipment is attempting to access, and the configurable random access procedure may include a numerology associated with the base station.

In still another example, the one of the plurality of random access procedure timelines 400 is associated with a cell size of a base station that the user equipment is attempting to access, and the configurable random access procedure may include a numerology associated with the base station and the cell size.

For example, as described, the UE 110 can receive information regarding the use case or deployment case, and/or the associated numerology, RACH timeline, etc., from the base station 105. For example, UE 110 can receive an indication of RRC state transition, handover, frequency band, cell size, etc. from the base station 105, and can accordingly determine the RACH timeline based on one or more of these parameters. In an example, an association of parameter values to RACH timeline can also be configured at the UE 110 (e.g., based on a stored configuration, a configuration received from base station 105, etc.), and the UE 110 can determine the numerology, RACH timeline, or related parameters based on the indication of RRC state transition, handover, frequency band, cell size, etc.

Additional aspects of the present disclosure may include UE 110 and base station 105 utilizing a reference timing in order to handle misalignment or delay in transmission or reception of one or more of the messages of the 4-step message flow 300 of NR RACH procedure 152. For example, if a transmission time of one of the RACH messages is delayed, UE 110 and base station 105 can locate a reference point, e.g., a start of a slot, to determine a reference timing for message transmission.

In another aspect, in NR RACH procedure 152, instead of having a fixed timing for transmission of Msg 3 303, UE 110 and base station 105 can utilize an option for a flexible transmission time for Msg 3 303. For instance, in a case where different UEs 110 have different processing capabilities, utilizing a flexible transmission time for Msg 3 303 allows a UE with a relatively higher UE capability (e.g., relatively faster processing) transmit Msg 3 faster than other UEs having a relatively lower UE capability. In one implementation, base station 105 may include a flexibility indication, also referred to as a request flexible transmission indicator, in Msg 2 302. In this example, the base station 105 may set the flexibility transmission indicator based at least in part on determining one or more parameters related to the UE 110, such as UE capability information, attainable throughput, UE class, buffer status report, etc. As such, upon receipt and decoding of Msg 2 302, UE 110 may transmit Msg 3 303 at a timing based on UE capability and according to the request flexible transmission indicator. Moreover, when UE 110 and base station 105 are performing time division duplex (TDD) operations, the flexible transmission time for Msg 3 303 may be utilized to postpone transmission of Msg 3 303 if such transmission conflicts with the resource scheduling (e.g., UL schedule in a slot for transmitting Msg 3, but that slot is scheduled to be DL).

Figure 11:
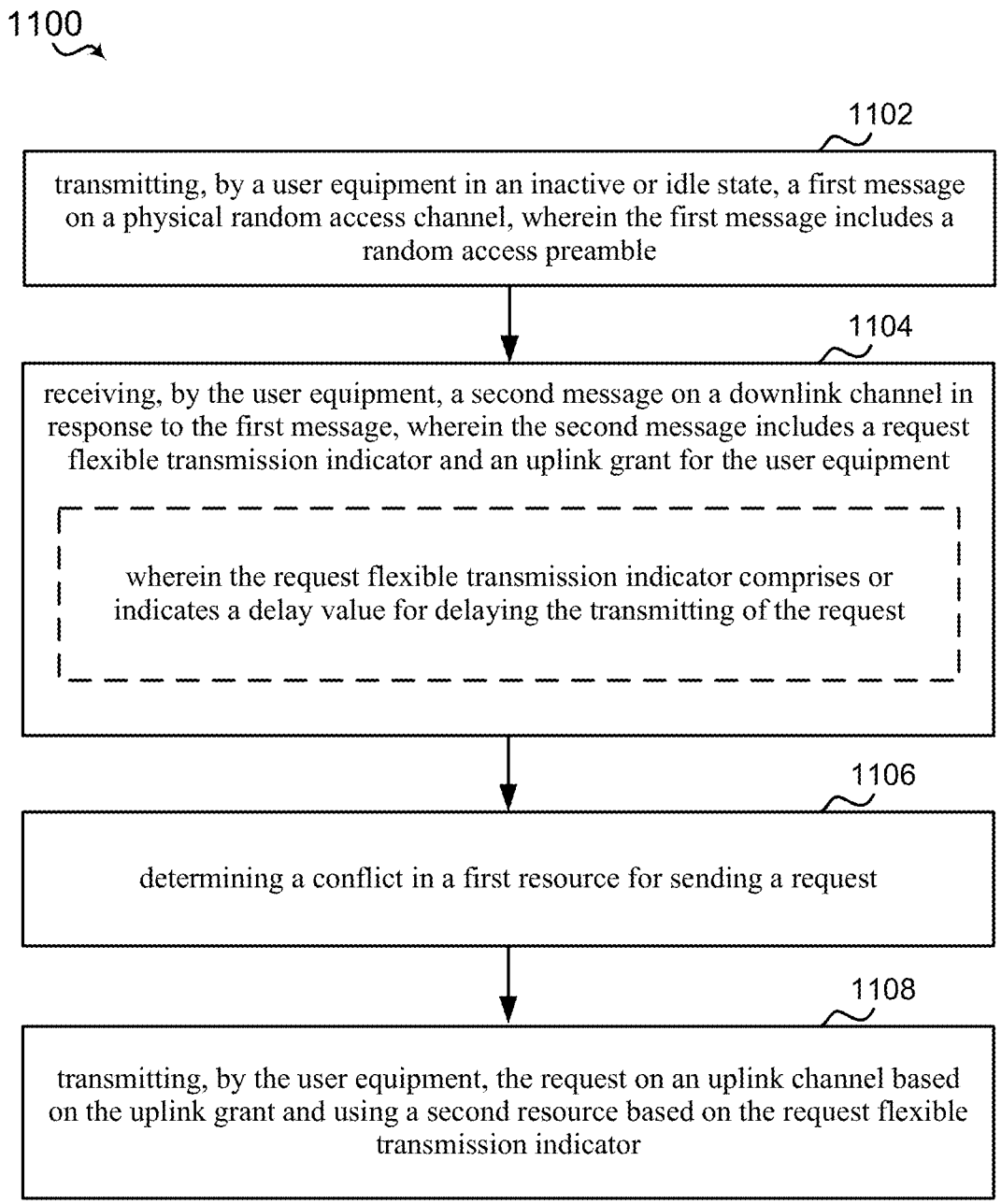
FIG. 11 is a flow diagram of an example of a method of performing a NR RACH procedure based on a flexible transmission indicator.

Referring to FIG. 11, in one implementation of a flexible transmission time for Msg 3 302, a method 1100 of wireless communications includes one or more of the above-described actions.

For instance, at 1102, method 1100 includes transmitting, by a user equipment in an inactive or idle state, a first message on a physical random access channel, wherein the first message includes a random access preamble. For instance, in an aspect, UE 110 may execute RACH controller component 150 and/or NR RACH procedure 152 to transmit Msg 1 301 via a transmitter (e.g., transmitter 1208, FIG. 12), as described herein.

At 1104, method 1100 includes receiving, by the user equipment, a second message on a downlink channel in response to the first message, wherein the second message includes a request flexible transmission indicator and an uplink grant for the user equipment. In an aspect, the request flexible transmission indicator comprises or indicates a delay value for delaying the transmitting of the request. For instance, in an aspect, UE 110 may execute RACH controller component 150 and/or NR RACH procedure 152 to receive Msg 2 302 via a receiver (e.g., receiver 1206, FIG. 12), as described herein.

At 1106, method 1100 includes determining a conflict in a first resource for sending a request. For instance, in an aspect, UE 110 may execute RACH controller component 150 and/or NR RACH procedure 152 to determine a conflict, e.g., to determine that a transmission scheduled for Msg 3 303 conflicts with a DL resource corresponding to the transmission.

Additionally, at 1108, method 1100 includes transmitting, by the user equipment, the request on an uplink channel based on the uplink grant and using a second resource based on the request flexible transmission indicator. For instance, in an aspect, UE 110 may execute RACH controller component 150 and/or NR RACH procedure 152 to delay the transmission of Msg 3 303 based on the conflict and further based on the flexibility for the transmission as indicated by the request flexible transmission indicator.

Figure 12:
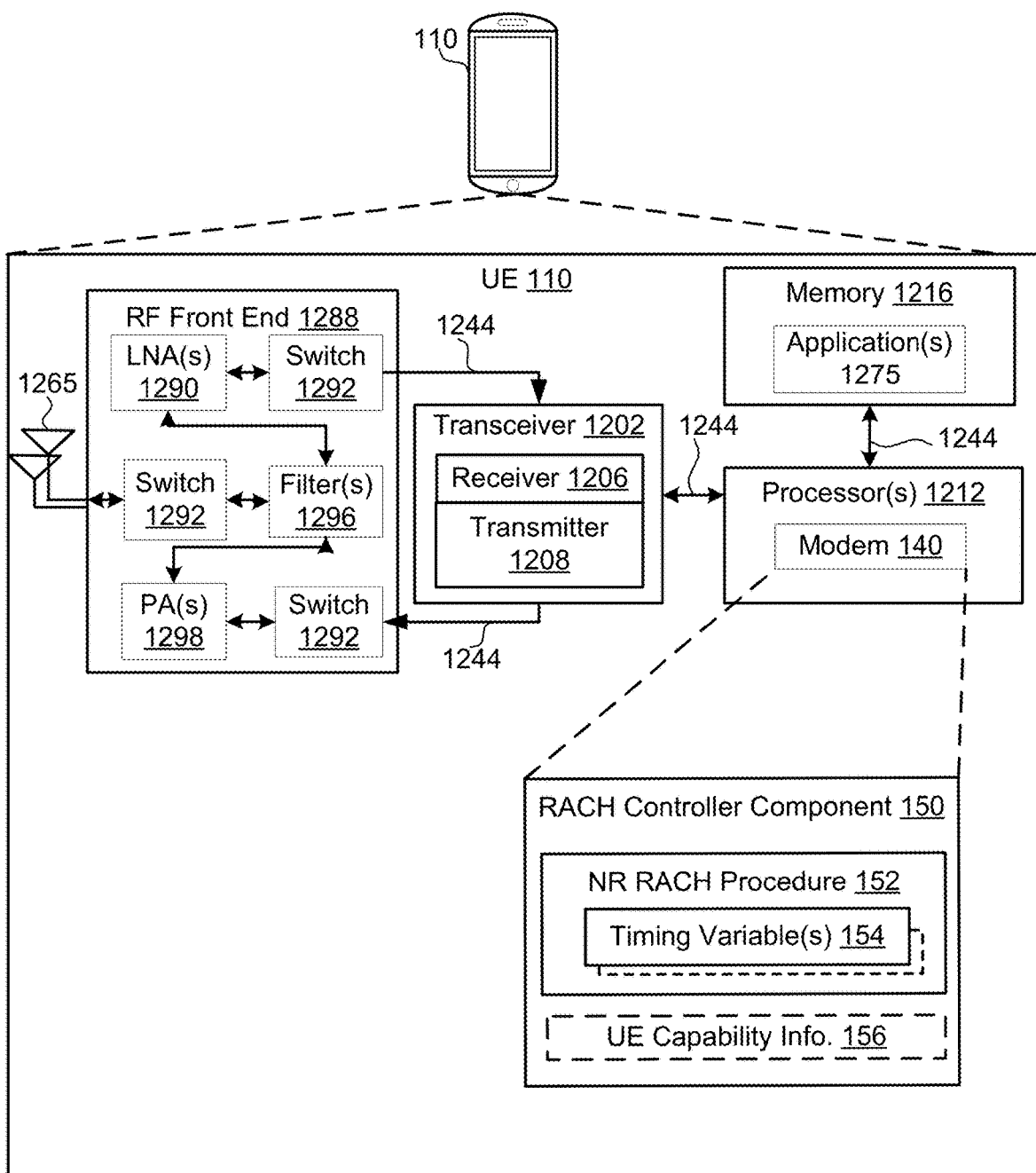
FIG. 12 is a schematic diagram of example components of a UE, in accordance with aspects described herein.

Referring to FIG. 12, one example of an implementation of UE 110 may include a variety of components, some of which have already been described above, but including components such as one or more processors 1212 and memory 1216 and transceiver 1202 in communication via one or more buses 1244, which may operate in conjunction with modem 140 and RACH controller component 150 to enable one or more of the functions described herein related to including configurable NR RACH procedure 152. Further, the one or more processors 1212, modem 140, memory 1216, transceiver 1202, RF front end 1288 and one or more antennas 1286, may be configured to support voice and/or data calls (simultaneously or non-simultaneously) in one or more radio access technologies.

In an aspect, the one or more processors 1212 can include a modem 140 that uses one or more modem processors. The various functions related to RACH controller component 150 may be included in modem 140 and/or processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 and/or modem 140 associated with RACH controller component 150 may be performed by transceiver 1202.

Also, memory 1216 may be configured to store data used herein and/or local versions of applications 1275 or RACH controller component 150 and/or one or more of its subcomponents being executed by at least one processor 1212. Memory 1216 can include any type of computer-readable medium usable by a computer or at least one processor 1212, such as random access memory (RAM), read only memory (ROM), tapes, magnetic discs, optical discs, volatile memory, non-volatile memory, and any combination thereof. In an aspect, for example, memory 1216 may be a non-transitory computer-readable storage medium that stores one or more computer-executable codes defining RACH controller component 150 and/or one or more of its subcomponents, and/or data associated therewith, when UE 110 is operating at least one processor 1212 to execute RACH controller component 150 and/or one or more of its subcomponents.

Transceiver 1202 may include at least one receiver 1206 and at least one transmitter 1208. Receiver 1206 may include hardware, firmware, and/or software code executable by a processor for receiving data, the code comprising instructions and being stored in a memory (e.g., computer-readable medium). Receiver 1206 may be, for example, a radio frequency (RF) receiver. In an aspect, receiver 1206 may receive signals transmitted by at least one base station 105. Additionally, receiver 1206 may process such received signals, and also may obtain measurements of the signals, such as, but not limited to, Ec/Io, SNR, RSRP, RSSI, etc. Transmitter 1208 may include hardware, firmware, and/or software code executable by a processor for transmitting data, the code comprising instructions and being stored in a memory (e.g., computer-readable medium). A suitable example of transmitter 1208 may including, but is not limited to, an RF transmitter.

Moreover, in an aspect, UE 110 may include RF front end 1288, which may operate in communication with one or more antennas 1265 and transceiver 1202 for receiving and transmitting radio transmissions, for example, wireless communications transmitted by at least one base station 105 or wireless transmissions transmitted by UE 110. RF front end 1288 may be connected to one or more antennas 1265 and can include one or more low-noise amplifiers (LNAs) 1290, one or more switches 1292, one or more power amplifiers (PAs) 1298, and one or more filters 1296 for transmitting and receiving RF signals.

In an aspect, LNA 1290 can amplify a received signal at a desired output level. In an aspect, each LNA 1290 may have a specified minimum and maximum gain values. In an aspect, RF front end 1288 may use one or more switches 1292 to select a particular LNA 1290 and its specified gain value based on a desired gain value for a particular application.

Further, for example, one or more PA(s) 1298 may be used by RF front end 1288 to amplify a signal for an RF output at a desired output power level. In an aspect, each PA 1298 may have specified minimum and maximum gain values. In an aspect, RF front end 1288 may use one or more switches 1292 to select a particular PA 1298 and its specified gain value based on a desired gain value for a particular application.

Also, for example, one or more filters 1296 can be used by RF front end 1288 to filter a received signal to obtain an input RF signal. Similarly, in an aspect, for example, a respective filter 1296 can be used to filter an output from a respective PA 1298 to produce an output signal for transmission. In an aspect, each filter 1296 can be connected to a specific LNA 1290 and/or PA 1298. In an aspect, RF front end 1288 can use one or more switches 1292 to select a transmit or receive path using a specified filter 1296, LNA 1290, and/or PA 1298, based on a configuration as specified by transceiver 1202 and/or processor 1212.

As such, transceiver 1202 may be configured to transmit and receive wireless signals through one or more antennas 1265 via RF front end 1288. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 1202 to operate at a specified frequency and power level based on the UE configuration of the UE 110 and the communication protocol used by modem 140.

In an aspect, modem 140 can be a multiband-multimode modem, which can process digital data and communicate with transceiver 1202 such that the digital data is sent and received using transceiver 1202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 1288, transceiver 1202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 13:
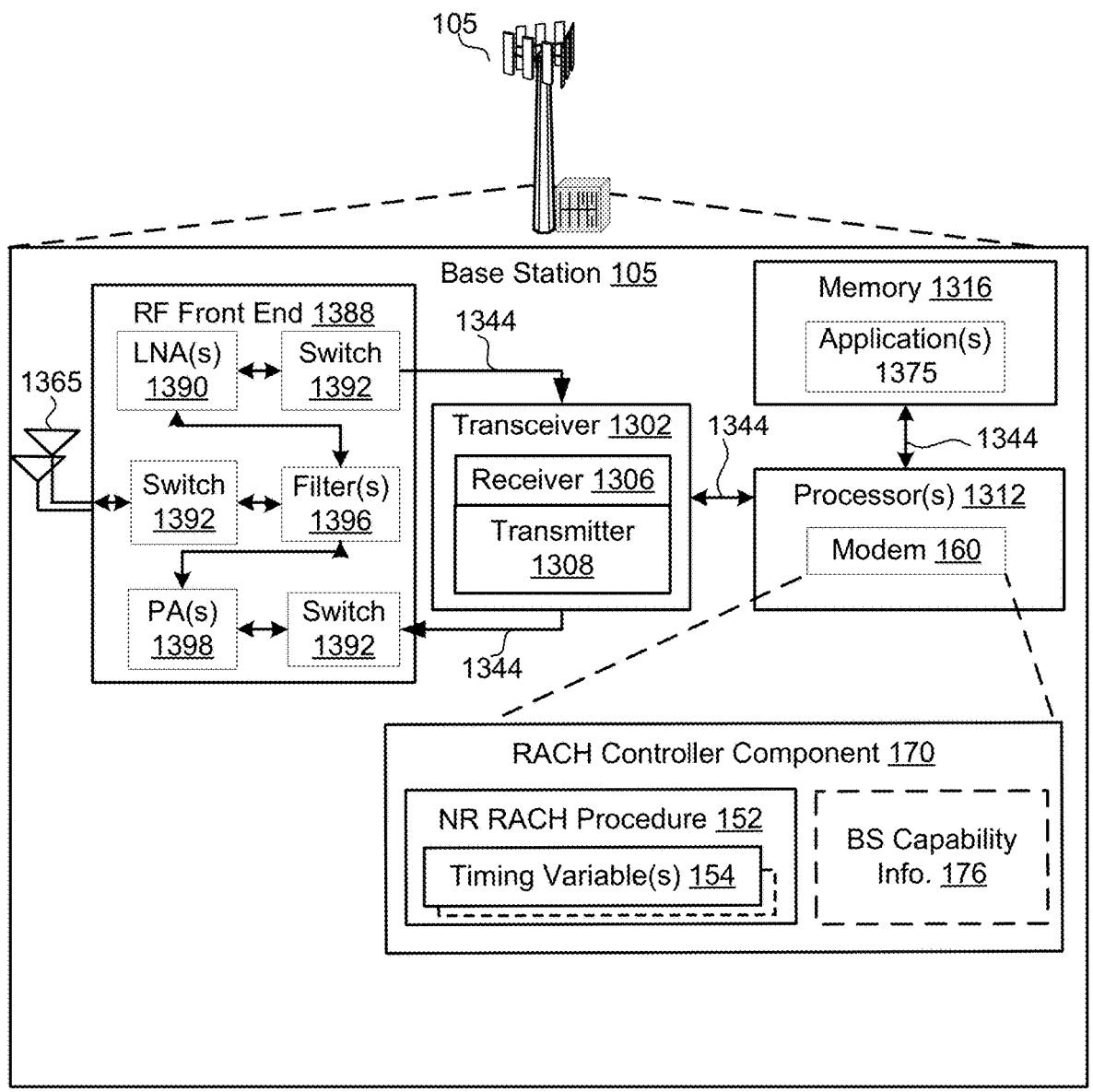
FIG. 13 is a schematic diagram of example components of the base station, in accordance with aspects described herein.

Referring to FIG. 13, one example of an implementation of base station 105 may include a variety of components, some of which have already been described above, but including components such as one or more processors 1312 and memory 1316 and transceiver 1302 in communication via one or more buses 1344, which may operate in conjunction with modem 160 and RACH controller component 170 to enable one or more of the functions described herein related to including configurable NR RACH procedure 152.

The transceiver 1302, receiver 1306, transmitter 1308, one or more processors 1312, memory 1316, applications 1375, buses 1344, RF front end 1388, LNAs 1390, switches 1392, filters 1396, PAs 1398, and one or more antennas 1365 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications, comprising:
   receiving, by a user equipment, a configuration to determine a random access procedure timeline of a use case or a deployment, from multiple random access procedure timelines that each define a different duration between one or more messages that are communicated in a random access procedure;
   transmitting, by the user equipment, a first message on a physical random access channel, wherein the first message includes a random access preamble;
   receiving, by the user equipment and based on the random access procedure timeline, a second message on a downlink channel in response to the first message, wherein the second message includes an uplink grant for the user equipment;
   transmitting, by the user equipment and based on the random access procedure timeline, a request or indicator on an uplink channel based on the uplink grant; and
   monitoring, by the user equipment, a downlink control channel for an acknowledgement message or a negative acknowledgement message corresponding to the request or indicator.

2. The method of claim 1,
   the configuration being further to determine a second random access procedure timeline of a second use case or deployment.

3. The method of claim 2, further comprising:
   monitoring, by the user equipment, in a window of the second random access procedure timeline and after transmitting a second request or indicator, acknowledgement of the second request or indicator.

4. The method of claim 3, further comprising:
   retransmitting, by the user equipment, the second request or indicator after the window responsive to not receiving acknowledgement in the window, without a second uplink grant after the window.

5. The method of claim 1, wherein the second message further includes a temporary cell radio network temporary identifier and wherein the acknowledgement message or the negative acknowledgement message corresponding to the request or indicator is identifiable based on the temporary cell radio network temporary identifier.

6. The method of claim 1, wherein transmitting the first message includes transmitting, by the user equipment in an inactive or idle state, the first message on the physical random access channel.

7. The method of claim 1, the request or indicator being associated with a trigger event of the random access procedure.

8. An apparatus for wireless communication, comprising:
   a transceiver;
   a memory configured to store instructions; and
   one or more processors communicatively coupled with the memory and the transceiver, wherein the one or more processors are configured to execute the instructions to cause the apparatus to:
   receive a configuration to determine a random access procedure timeline of a use case or a deployment, from multiple random access procedure timelines that each define a different duration between one or more messages that are communicated in a random access procedure;
   transmit a first message on a physical random access channel, wherein the first message includes a random access preamble;
   receive, based on the random access procedure timeline, a second message on a downlink channel in response to the first message, wherein the second message includes an uplink grant for the apparatus;
   transmit, based on the random access procedure timeline, a request or indicator on an uplink channel based on the uplink grant; and
   monitor a downlink control channel for an acknowledgement message or a negative acknowledgement message corresponding to the request or indicator.

9. The apparatus of claim 8, the configuration being further to determine a second random access procedure timeline of a second use case or deployment.

10. The apparatus of claim 9, wherein the one or more processors are further configured to execute the instructions to cause the apparatus to monitor, in a window of the second random access procedure timeline and after transmitting a second request or indicator, acknowledgement of the second request or indicator.

11. The apparatus of claim 10, wherein the one or more processors are further configured to execute the instructions to cause the apparatus to retransmit the second request or indicator after the window responsive to not receiving acknowledgement in the window, without a second uplink grant after the window.

12. The apparatus of claim 8, wherein the second message further includes a temporary cell radio network temporary identifier and wherein the acknowledgement message or the negative acknowledgement message corresponding to the request or indicator is identifiable based on the temporary cell radio network temporary identifier.

13. The apparatus of claim 8, wherein the one or more processors are configured to execute the instructions to cause the apparatus to transmit the first message including transmitting, in an inactive or idle state, the first message on the physical random access channel.

14. The apparatus of claim 8, the request or indicator being associated with a trigger event of the random access procedure.

15. A non-transitory computer-readable medium, comprising code executable by one or more processors for wireless communications, the code comprising code for:
   receiving, by a user equipment, a configuration to determine a random access procedure timeline of a use case or a deployment, from multiple random access procedure timelines that each define a different duration between one or more messages that are communicated in a random access procedure;
   transmitting, by the user equipment, a first message on a physical random access channel, wherein the first message includes a random access preamble;
   receiving, by the user equipment and based on the random access procedure timeline, a second message on a downlink channel in response to the first message, wherein the second message includes an uplink grant for the user equipment;

transmitting, by the user equipment and based on the random access procedure timeline, a request or indicator on an uplink channel based on the uplink grant; and monitoring, by the user equipment, a downlink control channel for an acknowledgement message or a negative acknowledgement message corresponding to the request or indicator.

16. The non-transitory computer-readable medium of claim 15, the configuration being further to determine a second random access procedure timeline of a second use case or deployment.

17. The non-transitory computer-readable medium of claim 16, further comprising code for monitoring, by the user equipment, in a window of the second random access procedure timeline and after transmitting a second request or indicator, acknowledgement of the second request or indicator.

18. The non-transitory computer-readable medium of claim 17, further comprising code for retransmitting, by the user equipment, the second request or indicator after the window responsive to not receiving acknowledgement in the window, without a second uplink grant after the window.

19. The non-transitory computer-readable medium of claim 15, wherein the second message further includes a temporary cell radio network temporary identifier and wherein the acknowledgement message or the negative acknowledgement message corresponding to the request or indicator is identifiable based on the temporary cell radio network temporary identifier.

20. The non-transitory computer-readable medium of claim 15, wherein the code for transmitting the first message includes code for transmitting, by the user equipment in an inactive or idle state, the first message on the physical random access channel.

* * * * *